(12) United States Patent
Caia et al.

(10) Patent No.: US 9,647,761 B1
(45) Date of Patent: May 9, 2017

(54) FLEXIBLE RATE COMMUNICATION SIGNALLING

(71) Applicant: INPHI CORPORATION, Santa Clara, CA (US)

(72) Inventors: Jean-Michel Caia, Plymouth, CA (US); Juan-Carlos Calderon, Fremont, CA (US); Arun Zarabi, San Jose, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 14/628,043

(22) Filed: Feb. 20, 2015

Related U.S. Application Data

(60) Provisional application No. 61/943,009, filed on Feb. 21, 2014.

(51) Int. Cl.
*H04B 10/27* (2013.01)

(52) U.S. Cl.
CPC .................................... *H04B 10/27* (2013.01)

(58) Field of Classification Search
CPC ...... H04L 47/826; H04J 14/021; H04J 3/1652
See application file for complete search history.

(56) References Cited

U.S. PATENT DOCUMENTS

| | | | | |
|---|---|---|---|---|
| 2010/0142947 A1* | 6/2010 | Shin | ...................... | H04J 3/1652 398/43 |
| 2012/0269511 A1* | 10/2012 | Calderon | .............. | H04J 3/1664 398/58 |
| 2015/0104178 A1* | 4/2015 | Su | ......................... | H04B 10/27 398/79 |

OTHER PUBLICATIONS

Jinno et al. (Introducing Elasticity and Adaptation Into the Optical Domain Toward More Efficient and Scalable Optical Transport Network, M. dinno, T. Ohara, Y. Sone, A. Hirano, O. Ishida, and M. Tomizawa NTT Network Innovation Laboratories, NTT Corporation, 2010).*
G.709/Y.1331, Interfaces for the optical transport network, ITU-T, (Feb. 2012), 238 pages.
G.709/Y.1331, Interfaces for the Optical Transport Network, Amendment 1, ITU-T, (Oct. 2012), 20 pages.
G.709/Y.1331, Interfaces for the Optical Transport Network (OTN), Corrigendum 1, ITU-T, (Oct. 2012), 7 pages.
G.709/Y.1331, Interfaces for the optical transport network, Amendment 2, ITU-T, (Oct. 2013), 14 pages.
Covering Note Erratum 1 (Jan. 2014) to Recommendation ITU-T G.709/Y.1331 (2014), Interfaces for the Optical Transport Network, 1 page.
G.709/Y.1331, Interfaces for the optical transport network (OTN), Amendment 4, ITU-T, (Jan. 2015), 8 pages
G.709/Y.1331, Interfaces for the optical transport network (OTN), Corrigendum 2, ITU-T, (Jan. 2015), 4 pages.
G.872, Architecture of optical transport networks, ITU-T, (Oct. 2013), 52 pages.

(Continued)

*Primary Examiner* — Shi K Li
*Assistant Examiner* — Mina Shalaby
(74) *Attorney, Agent, or Firm* — Richard T. Ogawa; Ogawa P.C.

(57) ABSTRACT

Flexible rate communication signalling apparatus and methods are disclosed. A determination is made as to a set of one or more of first frames and second frames which would provide a desired communication rate. The first frames and the second frames have a common frame structure but different associated rates. The determined set of one or more of the first frames and the second frames, including received client signals, is generated.

29 Claims, 22 Drawing Sheets

(56) References Cited

OTHER PUBLICATIONS

G.872, Architecture of optical transport networks, Amendment 1, ITU-T, (Nov. 2013), 12 pages.
G.709/Y.1331, Interfaces for the Optical Transport Network, Amendment 3, ITU-T, (Dec. 2014), 10 pages.

* cited by examiner

FLEXIBLE RATE COMMUNICATION SIGNALLING

CROSS-REFERENCE TO RELATED APPLICATION

This application is related to, and claims the benefit of, U.S. Provisional Patent Application Ser. No. 61/943,009, filed on Feb. 21, 2014, the entire contents of which are incorporated herein by reference.

FIELD OF THE INVENTION

This invention relates generally to communications and, in particular, to communication signalling with flexible rates.

BACKGROUND

The Optical Transport Hierarchy (OTH) is a transport technology for the Optical Transport Network (OTN) developed by the International Telecommunication Union (ITU). The main implementation of OTH is described in two recommendations by the Telecommunication Standardization section of the ITU (ITU-T), including:

Recommendation G.709/Y.1331, entitled "Interfaces for the optical transport network", February 2012, with an Erratum 1 (January 2014), a Corrigendum 1 (October 2012), an Amendment 1 (October 2012), an Amendment 2 (October 2013), an Amendment 3 (May 2014), a Corrigendum 2 (January 2015), and an Amendment 4 (January 2015).

Recommendation G.872, entitled "Architecture of optical transport networks", October 2012, with an Amendment 1 (November 2013).

Work toward OTN implementations for speeds beyond 100 Gbps, so-called B100G, is ongoing. Those familiar with OTN will recognize the OTN signal hierarchy, including OPU, ODU, and OTU signals or frames. The addition of "C" in the signal or frame types in the hierarchy, for OPUC, ODUC, and OTUC, represents "100" for 100 Gbps (hereinafter "G" is used as a short form for "Gbps") and higher speeds. An index "n", for OTUCn for instance, indicates a multiple of 100G. In one possible B100G implementation, an OTUC signal has a provisionable rate in increments of 100G. OTUC1=100G, OTUC2=200G, and so on, or more generally OTUCn=n×100G.

BRIEF DESCRIPTION OF THE DRAWINGS

Examples of embodiments will now be described in greater detail with reference to the accompanying drawings.

DETAILED DESCRIPTION

Aspects of the present disclosure relate to providing finer granularity in flexible bandwidth OTN implementations. As noted above, in one possible B100G implementation, an OTUC signal has a provisionable rate in increments of 100G. However, finer rate granularity could be useful, for example, to adapt signal rates to optical resources or other communications resources. In an embodiment, frames having a common frame format but different rates can provide for finer granularity.

Figure 1:
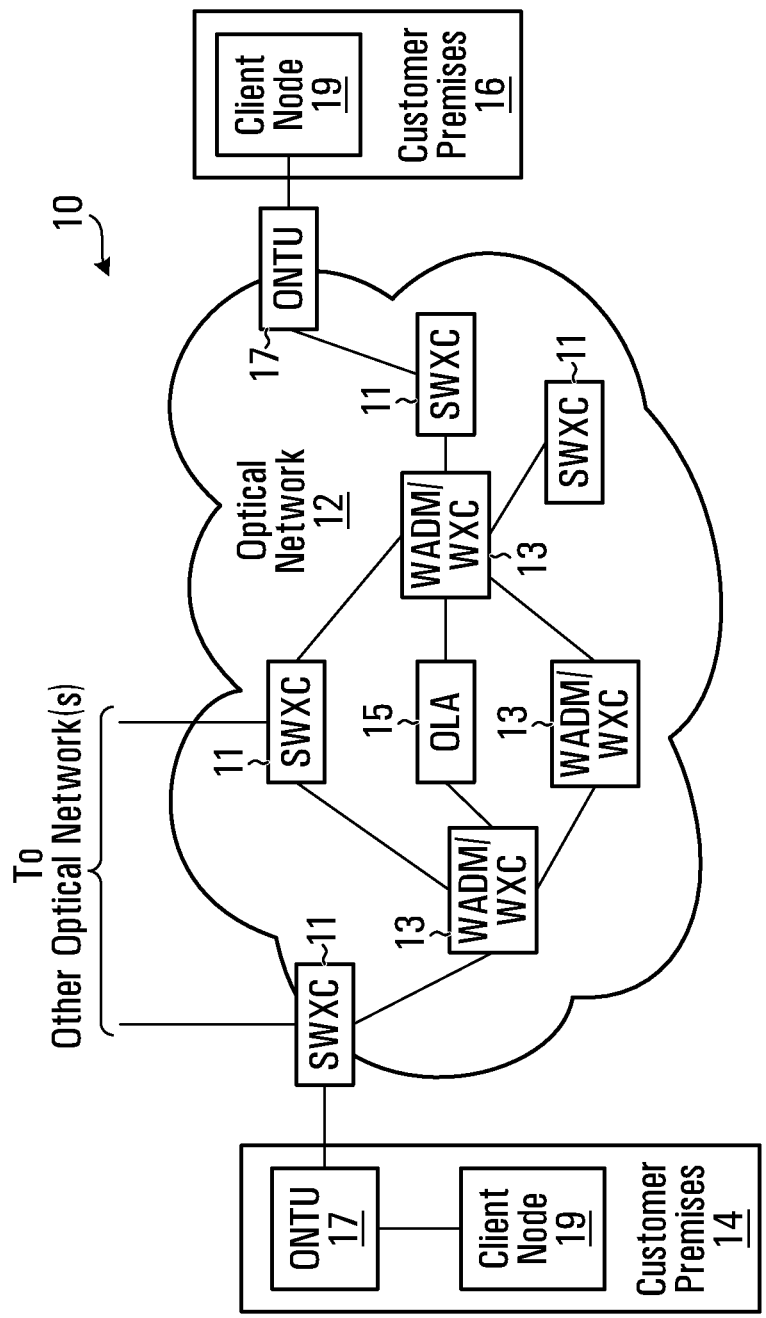
FIG. 1 is a block diagram of an example optical communication system.

FIG. 1 is a block diagram of an example optical communication system 10, which includes an optical network 12 and customer premises 14, 16, which in turn include different types of OTN equipment. At the customer premises 14, 16, there are client nodes 19, and the customer premises 14 also includes an OTN Network Termination Unit (ONTU) 17. Within the optical network 12, there are ONTUs, one of which is shown at 17 for the customer premises 16, Wavelength Add Drop Multiplexers/Cross Connects (WADM/WXCs) 13, Subwavelength Cross Connects (SWXCs) 11, and Optical Line Amplifiers (OLAs), one of which is shown at 15.

OTN networks, equipment, and their operation are described, for example, in ITU Recommendation G.798.1, entitled "Types And Characteristics Of Optical Transport Network (OTN) Equipment", April 2011. Aspects of the present disclosure could be implemented, for example, at the ONTUs 17, the SWXCs 11, and/or in any of the other customer or network equipment in which OTN signals are handled, to provide for flexible communication rates.

The label OTUL is used herein to designate lower-rate frames or signals that have the same format as, but a lower rate than, OTUC frames or signals. Consider an example of using OTUCn frames or OTULp frames to provide a provisionable rate up to 451 Gbps (400G-Class). Step sizes or increments of roughly 50G or roughly 100G could be provided using:

p×50G-class OTUL concatenated slices/frames (OTULp frame), up to 400G class, with (p=1 to 8);

n×100G-class OTUC concatenated slices/frames (OTUCn frame), up to 400G class, with (n=1 to 4); or a combination of OTUL and OTUC slices/frames.

These examples of 400G-class maximum rate and 50G-class OTUL rate are for illustrative purposes only. Other maximum rates and/or OTUL rates are possible. For example, maximum rates could include lower (e.g., 200G, 300G, etc.) or higher (e.g., 500G, 1T, etc.) maximum rates. The 50G-class OTUL rate is also an example, and there could be lower OTUL rates to provide finer granularity and/or higher OTUL rates to provide coarser granularity. The 10G granularity described herein is another example of an OTUL rate that could be provided in addition to or instead of the 50G OTUL rate.

The 10G, 50G, and 100G (and multiples) class rates referenced herein are not necessarily exact. OTN 10G class, for example, has an associated bit rate in the range of 10.7G to 11.4G, and therefore the rates herein are not intended to be fixed, exact rates. 10G or 10G-class herein could include this type of rate variation from the referenced "10G" rate, and similarly other rate variations in the other referenced rates are also possible.

An OTUCn(L) frame or signal herein is a concatenated structure of n or [n+1] OTUk frames. In the above example of a 50G OTUL frame and a provisionable rate by step of roughly 50 Gbps or 100 Gbps up to 400 Gbps, an OTUCn(L) signal or frame could include either:

n×concatenated OTUC at 100G (if p=2n), to generate an OTUCn frame or signal; or n×concatenated OTUC, plus one extra OTUL (half-rate OTUC, if p=2n+1), by means of heterogeneous concatenation, to generate an OTUCnL frame or signal, with the "L" indicating that the frame or signal includes at least one lower-rate constituent OTUL frame.

Up to [p×5] and/or [n×10] 10G ODUj clients (j=4, 3, 3e, 2, 2e, 1e, 0, flex) could be aggregated into the flexible/adaptable Higher Order (HO) OTUCnL line signal with 10 Gbps Tributary slots granularity in this example (p×50G-class OTUL line, with p=1 to 8, and/or n×100G-class OTUCn line, with n=1 to 4, depending on the desired or target communication rate).

The number of Forward Error-correction Code (FEC) columns per OTUC/OTUL slice could be provisioned to:

16 columns (OTUk-240–no FEC);

6×16 columns (OTUk-245);

11×16 columns (OTUk-250);

16×16 columns (OTUk)–Supports High-Gain (HG)-FEC or GFEC.

OTLCn(L).m is a Multi-lane interface to carry the inversely multiplexed flexible and rate adaptable OTUCn(L) signal. The label "m" refers to a number of Electrical Lanes (ELs), also known as Physical Lanes, in the interface. In an embodiment, the interface is flexible and rate adaptable to p×50G-class with p=1 to 8 or n×100G-class or combinations with n=1 to 4 OTN line signals up to 400G-class, although other rates are also possible.

Each EL includes bit-interleaved Logical Lanes (LLs). The number of bit-interleaved LLs per OTLCn(L).m EL can be provisioned to a parameter u (common to all m ELs) with:

u={3, 4, or 5} when m=[4×n] or m=[4×n+2] for 25G-Class electrical lanes;

u={2} when m=[8×n] or m=[8×n+4] for 14G-Class electrical lanes;

u={2} when m=[10×n] or m=[10×n+5] for 10G-Class electrical lanes.

A 50G rate OTUL frame or signal is described above as an illustrative example. In another embodiment, an OTUCn (L) frame or signal has a provisionable rate up to 451 Gbps (400G-Class), by step of roughly 10G, 50G or 100G, using:

X×10G-class frames or p×50G-class frames, up to 400G-class, with (X=1 to 40/p=1 to 8);

n×100G-class (OTUCn, up to 400G-class, with (n=1 to 4); or combinations of such frames of different class rates.

An OTUCn(L) concatenated structure of n (or [n+1]) OTUk frames and a provisionable rate by step of roughly 10 Gbps, 50 Gbps or 100 Gbps up to the example maximum 400G class could include, for example, either:

n×concatenated OTUC (if p=2n or X=10n); or n×concatenated OTUC, plus one extra OTUL (with a half-rate 50G-class OTUL, if p=2n+1 or with a [q/10]-rate OTUL (for 10G granularity), when X=[10n+q] and q is not zero).

Up to X, [p×5], and/or [n×10] ODUj clients (j=4, 3, 3e, 2, 2e, 1e, 0, flex) could be aggregated into a flexible/adaptable HO OTUCn(L) line signal with 10 Gbps Tributary slots granularity (X×10G-class/p×50G-class OTUL line, with X=1 to 40/p=1 to 8, or n×100G-class OTUCn line, with n=1 to 4, depending on the desired or target communication rate).

The following examples further illustrate rate flexibility and granularity:

OTUL=10G, 20G, 30G, . . . , 50G, . . . , 90G signal over m×28G (25G-class) Electrical Lanes (OTLL.m, m=1, 2, 3, 4, with "L" indicating lower-rate communications below 100G);

OTUC1=100G signal carried over 4×28G Electrical Lanes (OTLC1.4, m=4);

OTUC1L=110G, 120G, . . . , 150G, . . . , 190G signal over m×28G Electrical Lanes (OTLC1 L.m, m=5, 6, 7, 8);

OTUC2=200G signal carried over 8×28G Electrical Lanes (OTLC2.8, m=8);

OTUC2L=210G, 220G, . . . , 250G, . . . , 290G signal over m×28G Electrical Lanes (OTLC2L.m, m=9, 10, 11, 12);

OTUC3=300G signal carried over 12×28G Electrical Lanes (OTLC3.12, m=12);

OTUC3L=310G, 320G, . . . , 350G, . . . , 390G signal over m×28G Electrical Lanes (OTLC3L.m, m=13, 14, 15, 16);

OTUC4=400G Line Signal carried over 12×28G Electrical Lanes (OTLC4.16, m=16).

The number of FEC columns per OTUC/OTUL slice can be provisioned for 10G granularity in the same manner as above, to:

16 columns (OTUk-240–no FEC);

6×16 columns (OTUk-245);

11×16 columns (OTUk-250);

16×16 columns (OTUk)–supports GFEC (also supports HG-FEC but then OTUL slice is handled as independent payload).

As noted above, OTLCn(L).m is an I×25G-class (I=1 to 16) or X×10G-class (I=1 to 40) Multi-lane interface carrying a flexible and rate adaptable X×10G-class (X=1 to 40) OTN line signal up to 400G-class in one embodiment.

The OTL Logical Lanes bit rate is 5.6 Gbps in one embodiment; there could be u bit-interleaved 5.6G Logical Lanes per OTLCn(L).m electrical lane with:

u=5 when m=[4×n+CEILING(q×10/25)] in the case of 25G-Class electrical lanes (including 1 to 4 dummy LL (OTL-AIS) in the last Electrical Lane when I×25G≠X×10G; or u=2 with m=[10×n+q] in the case of 10G-Class electrical lanes, for example.

Figure 2:
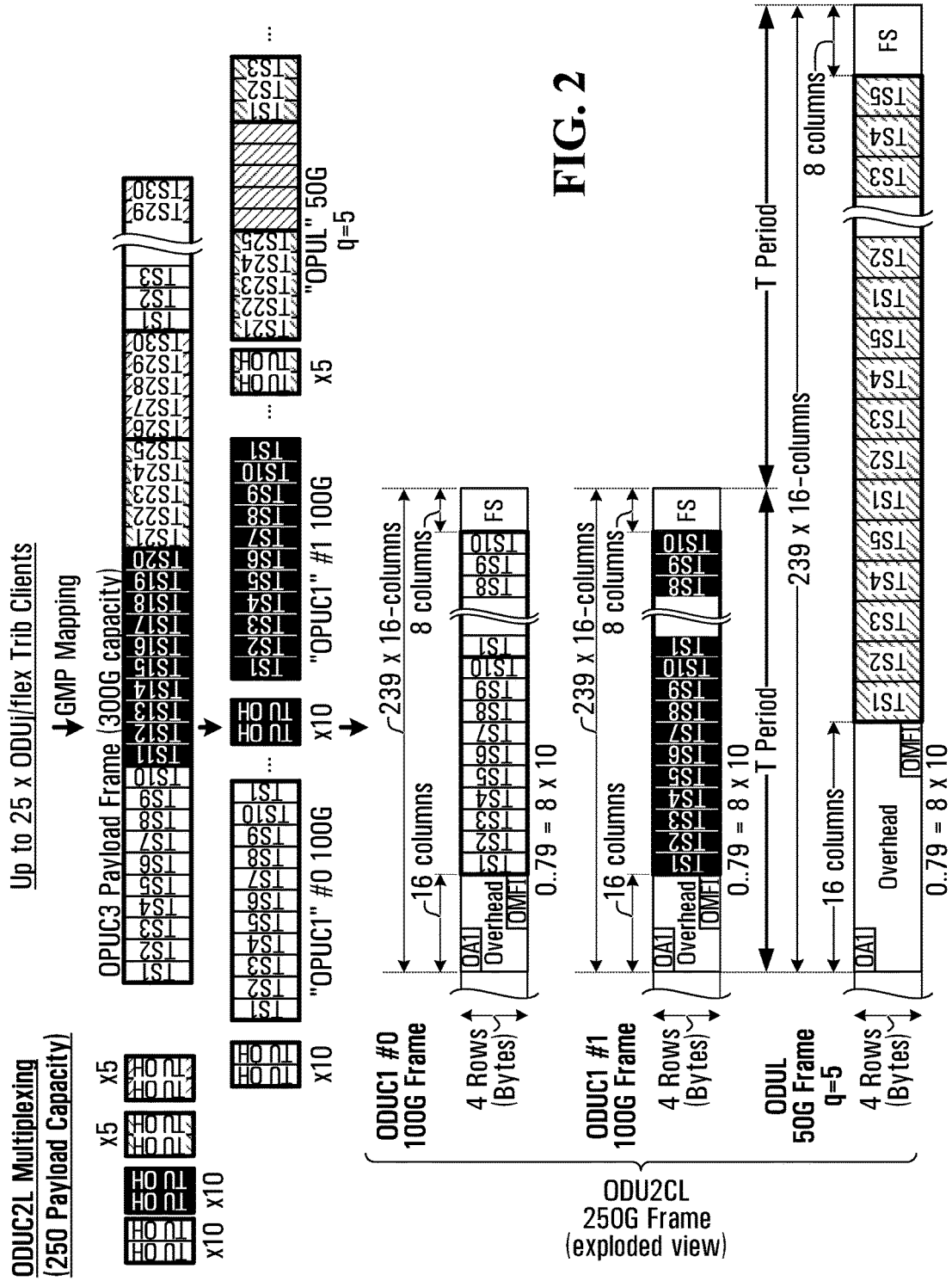
FIG. 2 illustrates an example of ODUC2L multiplexing to provide 250G payload capacity with 10G Tributary Slots.

FIG. 2 illustrates an example of ODUC2L multiplexing to provide 250G payload capacity with 10G Tributary Slots. For this rate and in the example shown, there could be up to 25 ODUj/flex tributary clients using 10G tributary slots, and the 250G desired or target rate could be provided using p=5×50G ODUL frames, X=25×10G ODUL frames, n=2× ODUC frames plus X=5×10G ODUL frames, or as shown in FIG. 2, n=2×ODUC frames plus p=1×50G ODUL frame. The two 100G ODUC frames ODUC1 #0 and ODUC1 #1 in FIG. 2 would be concatenated with the 50G ODUL frame.

Figure 3:
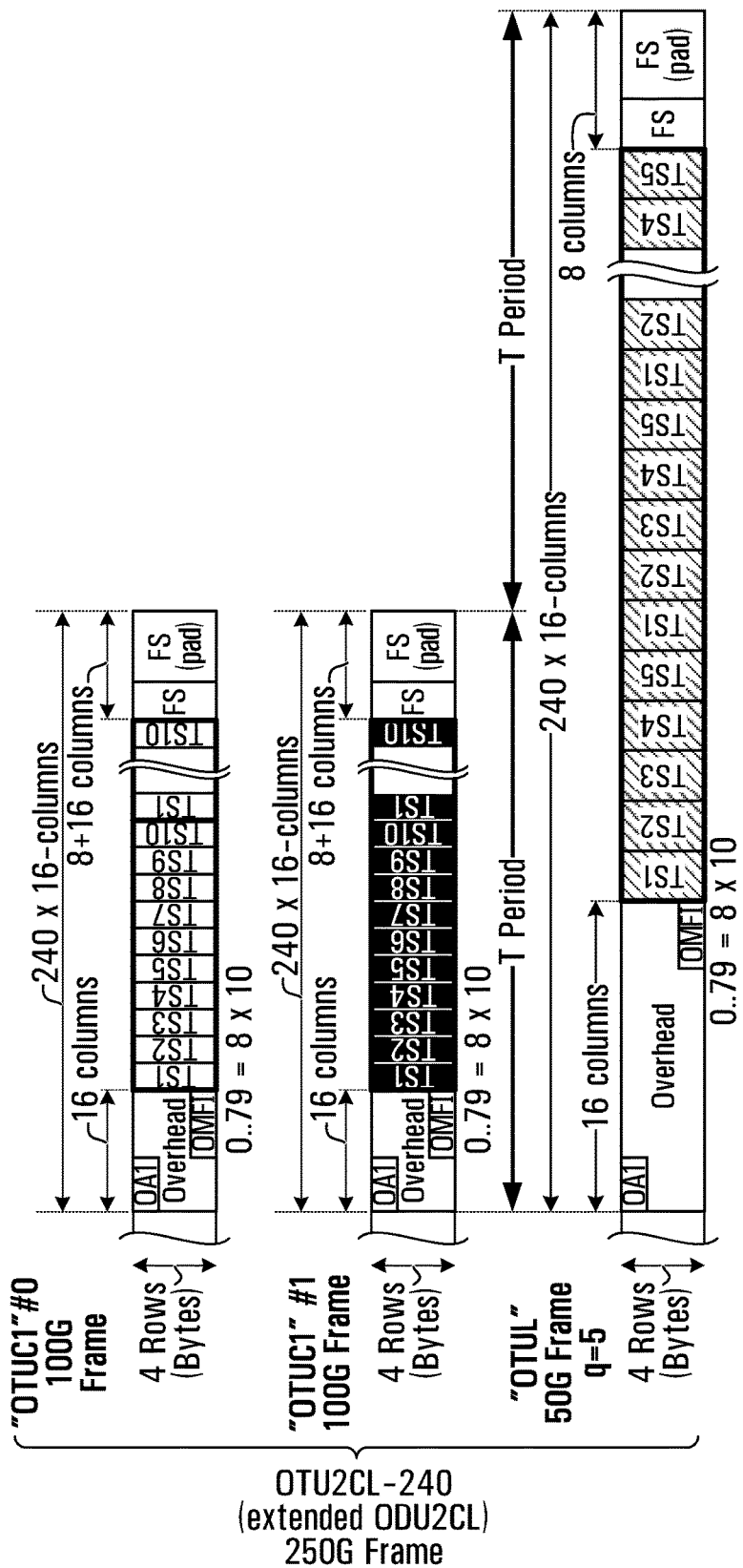
FIG. 3 shows a related example OTUC2L-240 structure (extended ODUC2L) to provide 250G payload capacity with 10G Tributary Slots.
Figure 4:
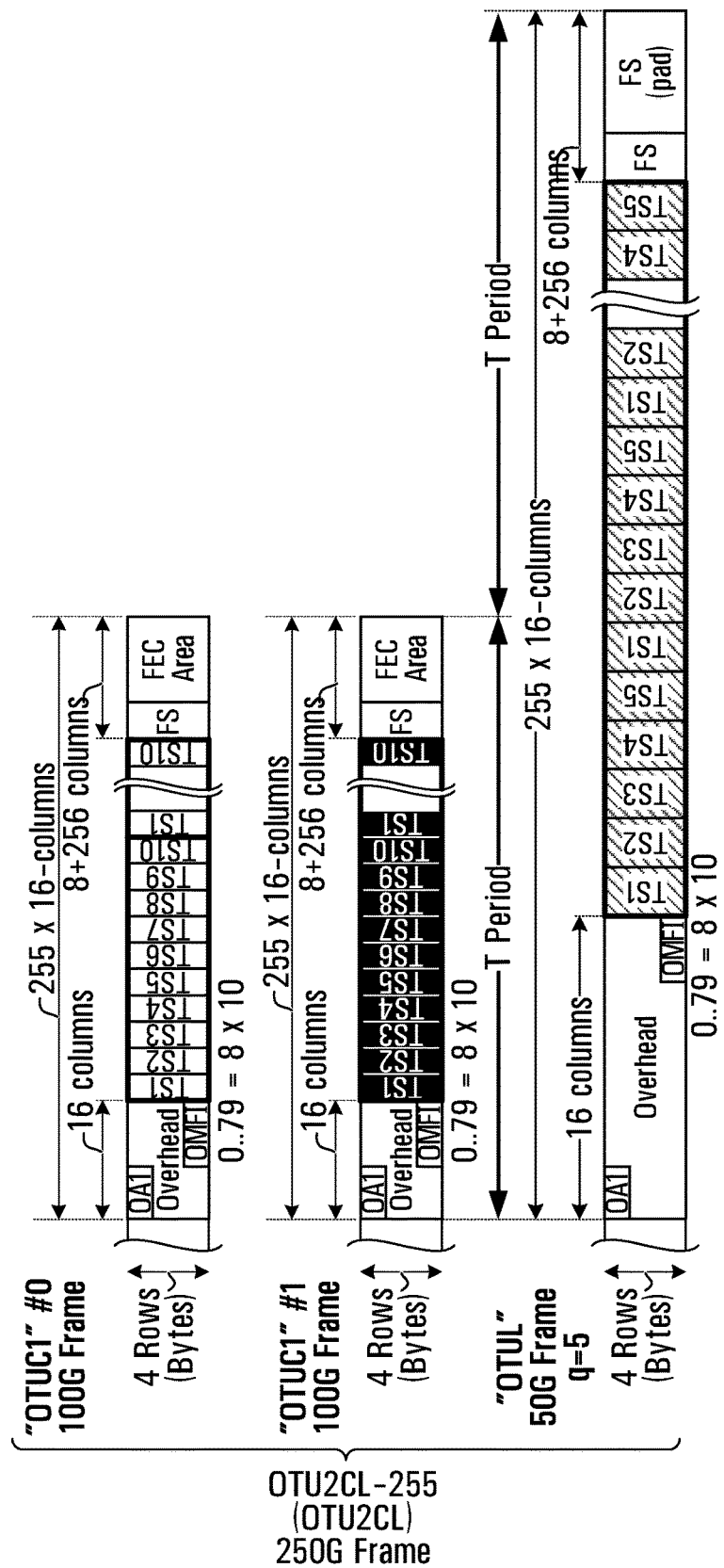
FIG. 4 shows a related example OTUC2L-255 structure to provide 250G payload capacity with 10G Tributary Slots.

FIG. 3 shows a related example OTUC2L-240 structure (extended ODUC2L) to provide 250G payload capacity with 10G Tributary Slots and FIG. 4 shows a related example OTUC2L-255 structure to provide 250G payload capacity with 10G Tributary Slots, with FS padding in FIG. 3 and FEC areas in FIG. 4.

Figure 5A:
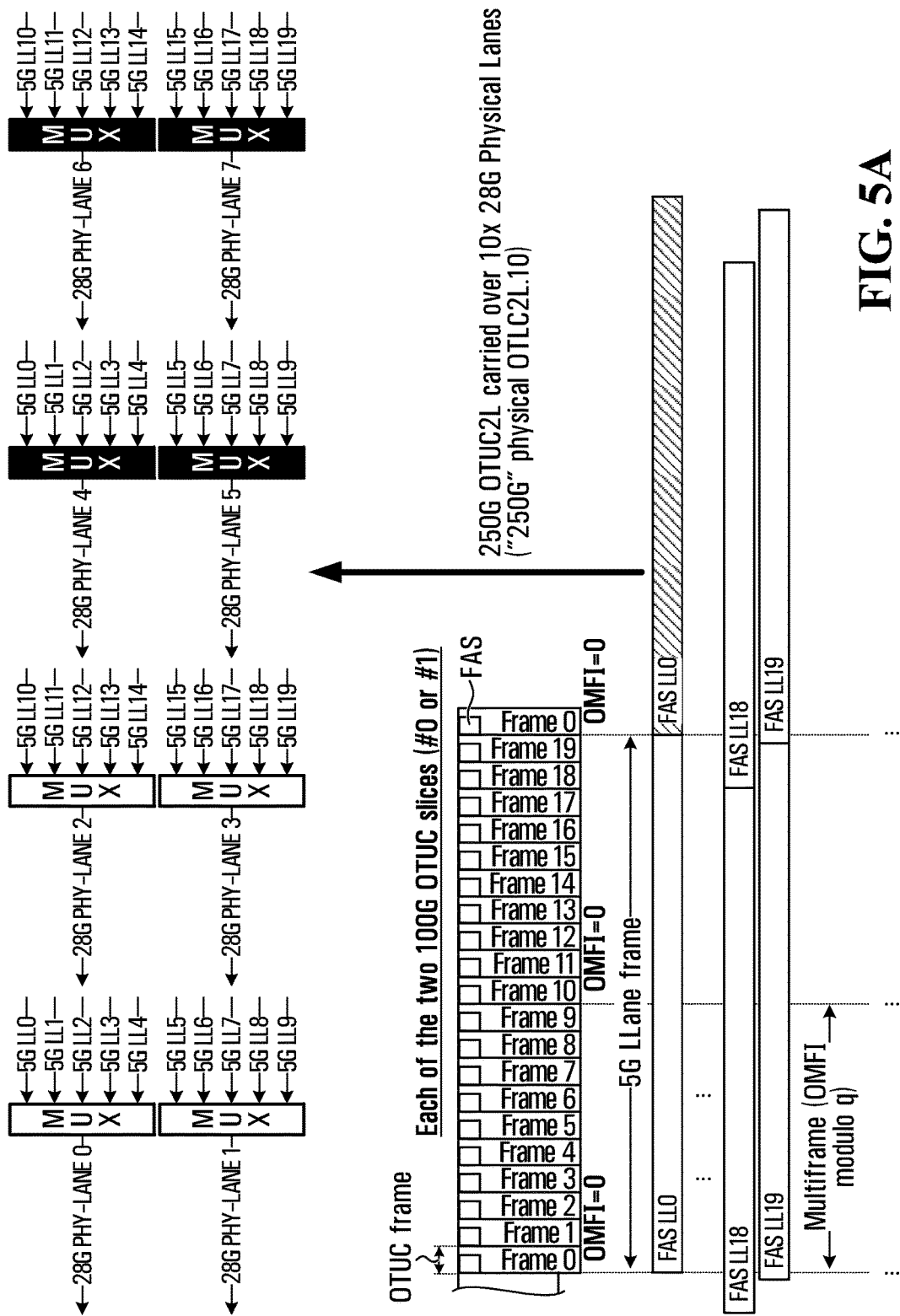
FIGS. 5A and 5B show an example OTLC2L.10 interface with 10×28G Physical Lanes, for an example of 10G Tributary Slots.
Figure 5B:
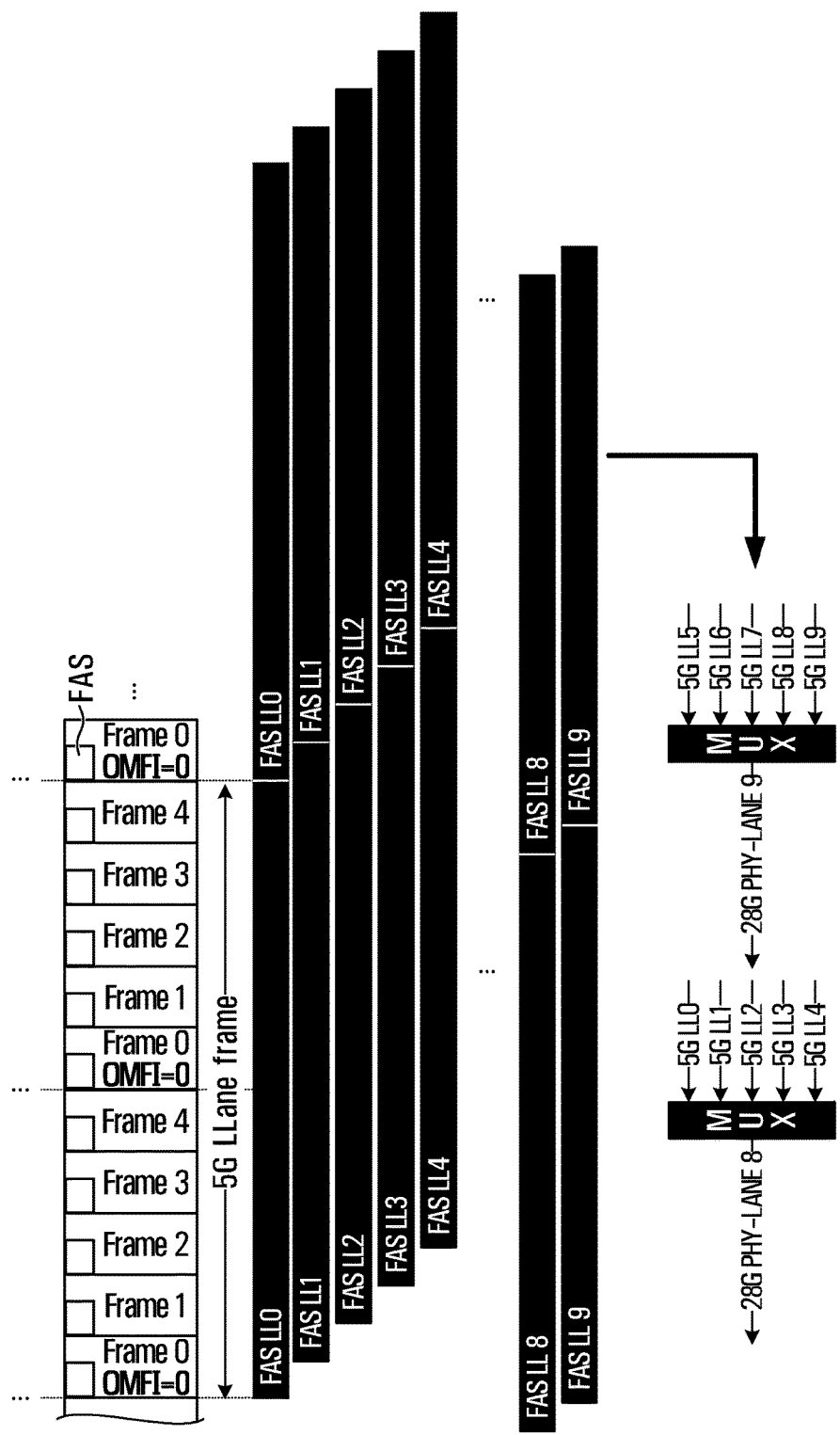

FIGS. 5A and 5B show an example OTLC2L.10 interface for an example of 10G Tributary Slots and (n,q)=(2,5), with 10×28G (25G-class) Physical Lanes, each labelled in the drawing as a PHY-LANE. OTUC and OTUL slices and logical lane frames are also shown. The OTUC and OTUL slices have different numbers of frames per multiframe and thus different frame rates, but the frame formats and the multiframe rates are the same. Slices/frames can be handled and inversely multiplexed in a similar manner into Logical Lanes of same formats and same bit rates (for example 5.6 Gbps) regardless of whether the slice/frame is an OTUC slice/frame or an OTUL slice/frame. A difference is in the number of 5.6 Gbps LLs the OTUC or OTUL is inversely multiplexed to/from, which is proportional to the bit rate of the OTUC frame and the OTUL frame, respectively, as well as the number of frames per multiframe to handle a common deskew function. Thus, finer granularity can be provided (at the Logical Lane level) without implementing customized or specialized processing which is dependent on slice/frame type.

Figure 6:
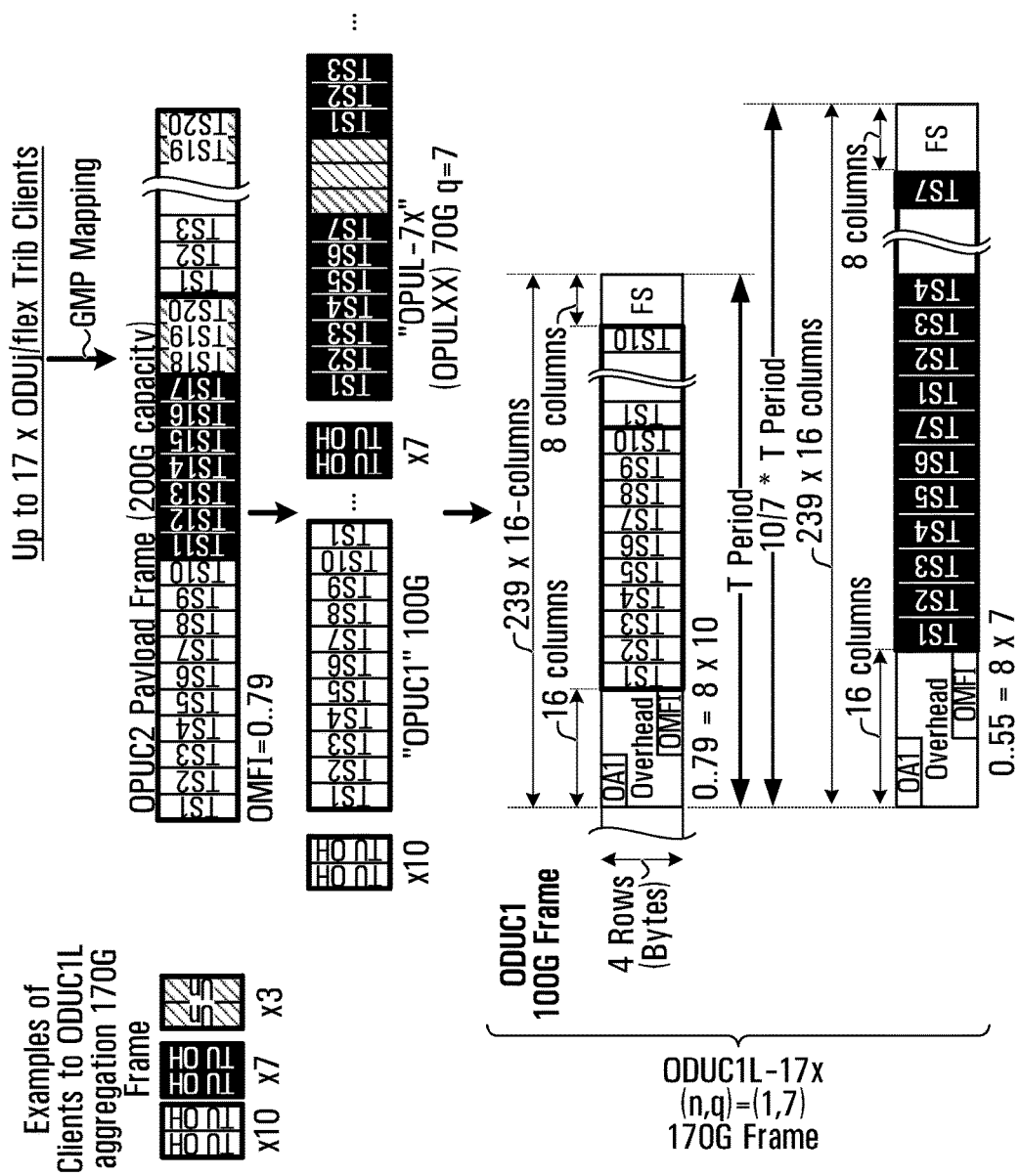
FIG. 6 illustrates an example of ODUC1L (ODUC-1L-17x) multiplexing to provide 170G payload capacity with 10G Tributary Slots.

FIG. 6 illustrates an example of ODUC1L (ODUC-1L-17x) multiplexing to provide 170G payload capacity with 10G Tributary Slots and (n,q)=(1,7). For this rate and in the example shown, there could be up to 17 ODUj/flex tributary clients using 10G tributary slots, and the 170G desired or target rate could be provided using any of various combinations of 100G, 50G, and 10G ODUL frames. In the example shown, there is 1 ODUC frame plus 1 70G ODUL frame. At the OPU level in FIG. 6, this is shown as 7 10G frames.

Figure 7:
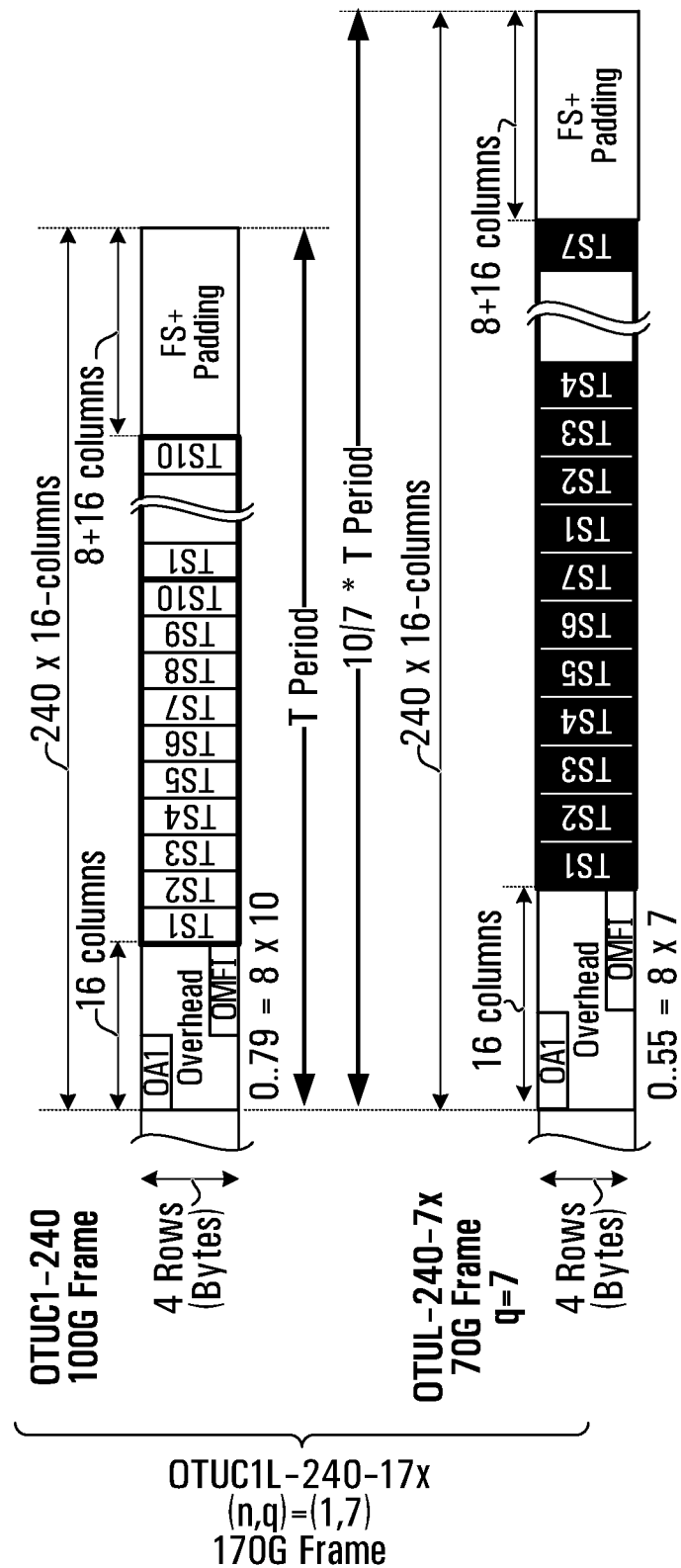
FIG. 7 shows a related example OTUC1L-240-17x structure (extended ODUC1L-17x) to provide 170G payload capacity with 10G Tributary Slots.
Figure 8:
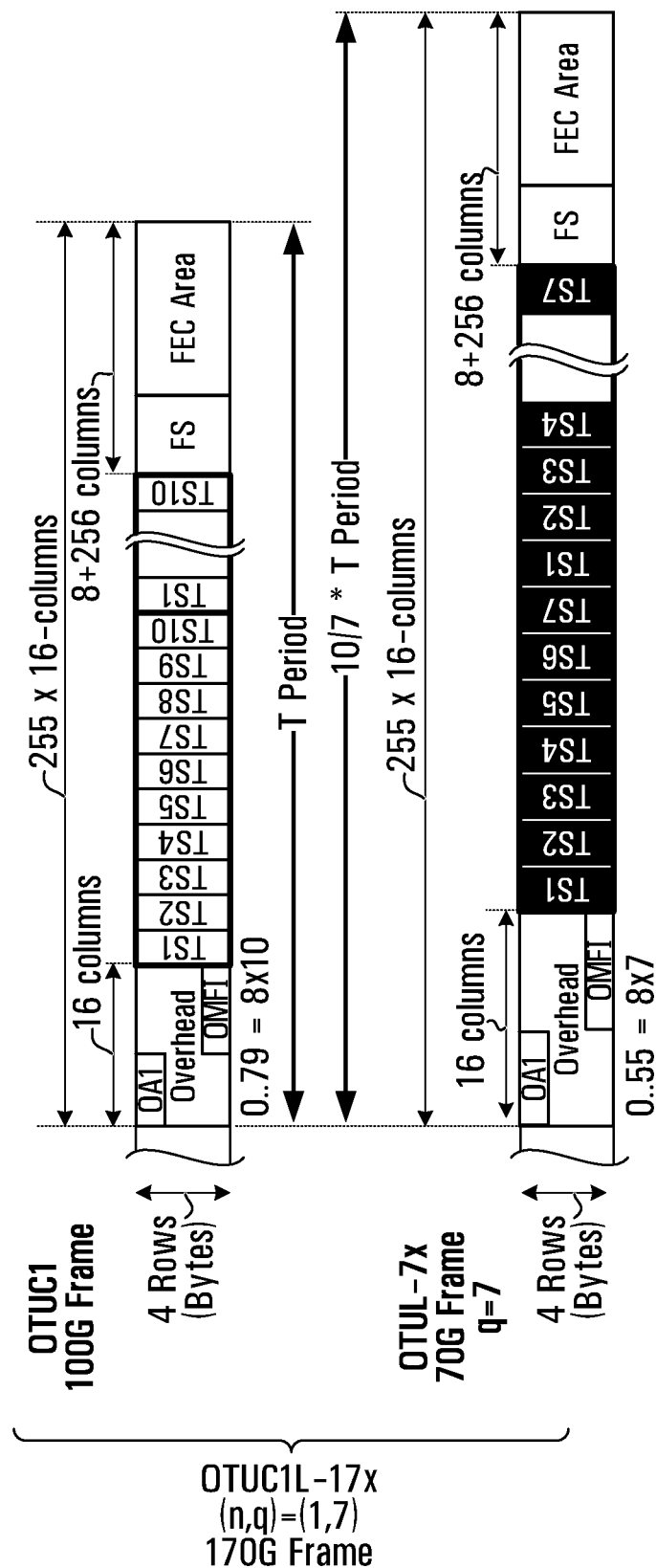
FIG. 8 shows a related example OTUC1L-17x structure to provide 170G payload capacity with 10G Tributary Slots.

FIG. 7 shows a related example OTUC1L-240-17x structure (extended ODUC1L-17x) to provide 170G payload capacity with 10G Tributary Slots and FIG. 8 shows a related example OTUC1L-17x structure to provide 170G payload capacity with 10G Tributary Slots, with FS padding in FIG. 7 and FEC areas in FIG. 8.

Figure 9A:
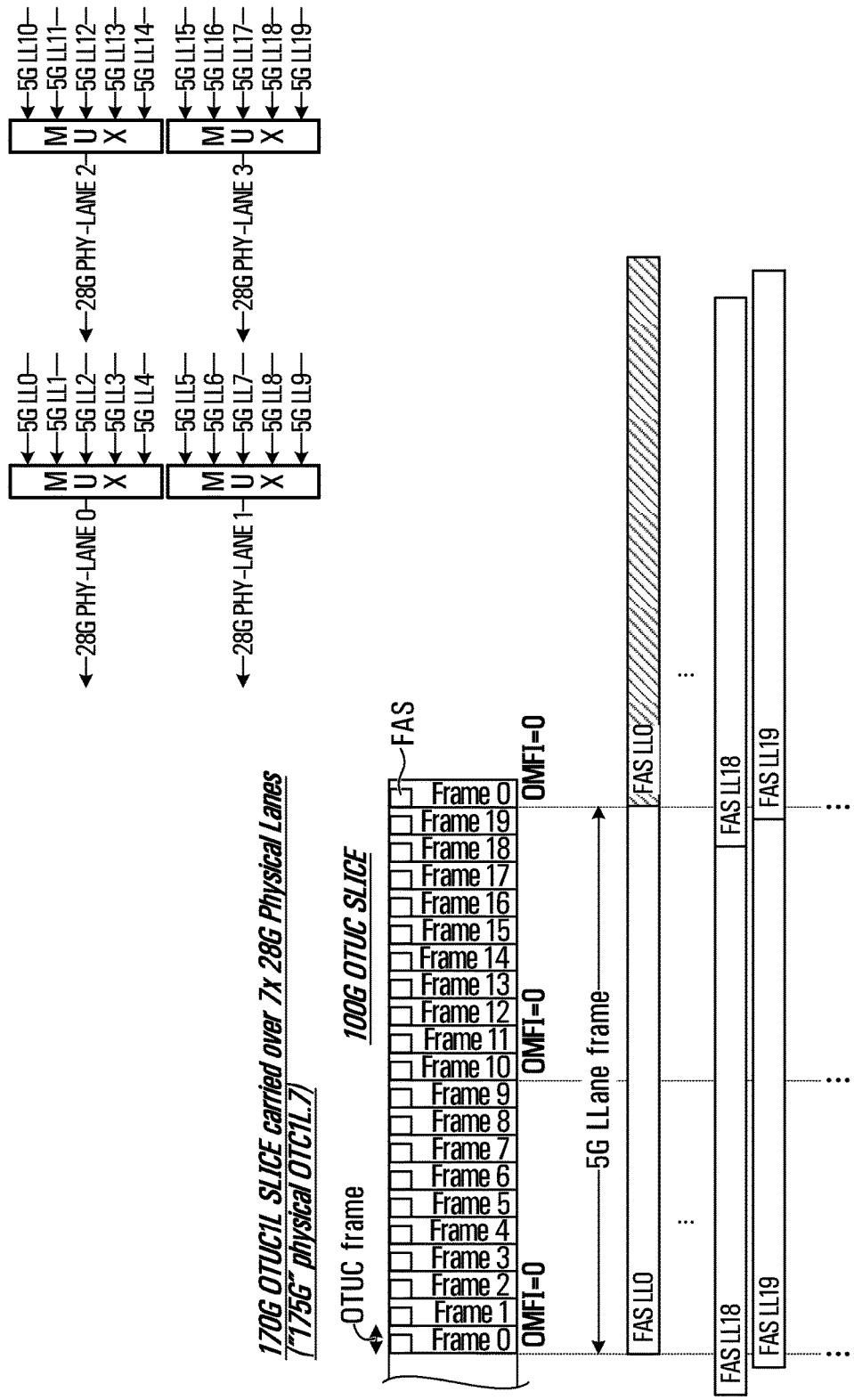
FIGS. 9A and 9B show an example OTLC1 L.7 interface with 7×28G Physical Lanes, for an example of 10G Tributary Slots.
Figure 9B:
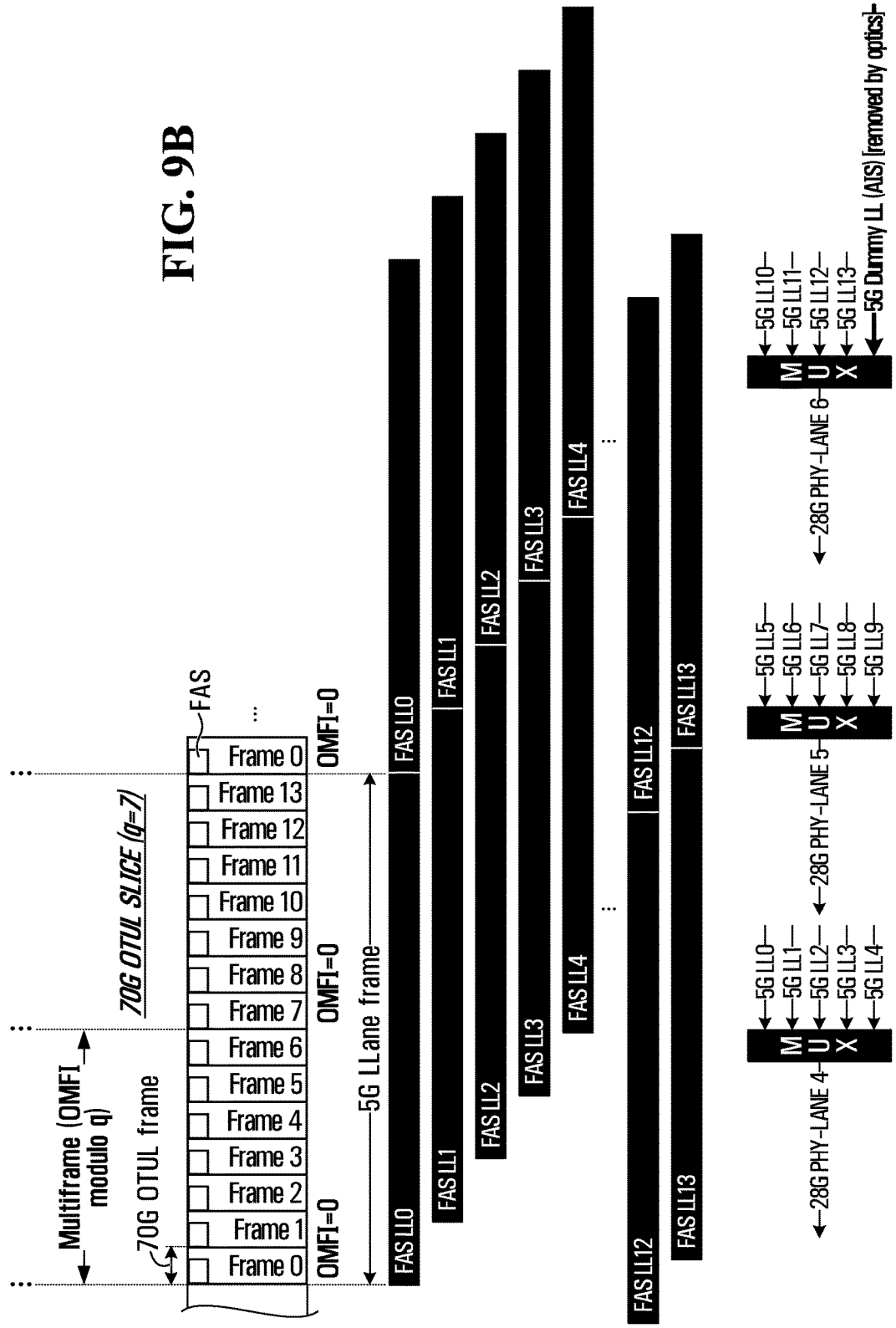

FIGS. 9A and 9B show an example OTLC1 L.7 interface with 7×28G Physical Lanes, for an example of 10G Tributary Slots and (n,q)=(1,7). As in FIGS. 5A and 5B, OTUC and OTUL slices and logical lane frames are also shown and the OTUC and OTUL slices have different numbers of frames per multiframe and thus different frame rates. However, the frame formats are the same and slices/frames can be handled and inversely multiplexed in a similar manner into Logical Lanes of same formats and same bit rates (for example 5.6 Gbps) regardless of whether the slice/frame is an OTUC slice/frame or an OTUL slice/frame. A difference is in the number of 5.6 Gbps LLs the OTUC or OTUL is inversely multiplexed to/from, which is proportional to the bit rate of the OTUC frame and the OTUL frame, respectively, as well as the number of frames per multiframe to handle a common deskew function. For 28G PHY-LANE (Physical Lane) 6, a 5G dummy LL (Logical Lane) is shown since q=7 and only 2q=14 LLs (not all 15 available LLs) are used on the 28G PHY lanes 4 to 6. Any dummy LLs could be dropped by an optical interface in a transmit direction or generated by the optical interface to a framer in a receive direction.

Figure 10:
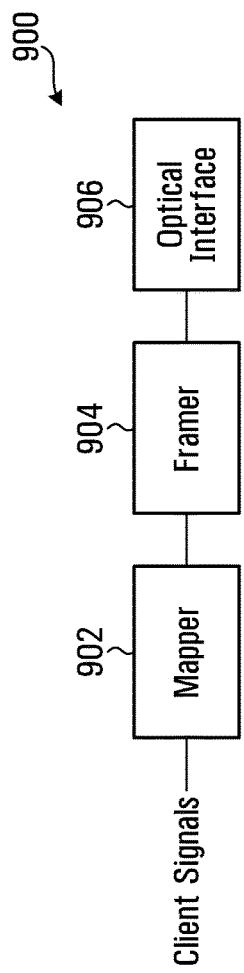
FIG. 10 is a block diagram of an example of optical communication equipment.

FIG. 10 is a block diagram of an example of optical communication equipment 900. Other embodiments and/or actual implementations could include fewer, additional, and/or different components than shown, interconnected in a similar or different order. The example equipment 900 includes a mapper 902, a framer 904, and an optical interface 906. These types of components are common in OTN optical communication equipment, however at least the framer 904 differs from conventional equipment implementations in that frames having different rates are used by the framer to provide rate flexibility and finer rate granularity.

Generally, the components in FIG. 10 could be implemented using hardware, components that execute software, or firmware. Electronic devices or circuitry that might be suitable for this purpose include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

In operation, client signals are received by the framer 904 through a connection or other form of interface to which it is coupled. In the example shown in FIG. 10, the mapper 902 maps the client signals, into OPU frames for example, and provides the mapped client signals to the framer 904. The client signals are for communication in an optical network, through the optical interface 906.

The framer 904 determines a set of one or more of first frames and second frames that have a common frame structure but different associated rates, which will provide a desired communication rate. The framer 904 also generates the determined set of one or more of the first frames and the second frames including the received client signals. The set could include one or more first frames (e.g., an OTUC frame or multiple OTUC frames), one or more second frames (e.g., an OTUL frame or multiple OTUL frames) or a combination of OTUC and OTUL frames. For example, the first frames could have an associated rate of 100G, and the second frames could have an associated rate of any multiple of 10G up to 90G, any multiple of 5G up to 95G, or any multiple of 25G up to 75G.

The framer 902 need not necessarily make the set determination dynamically. It could make the determination by reading configuration(s), variable(s), or setting(s) from memory, for example. Such memory could be implemented in one or more memory devices, such as solid-state memory devices and/or memory devices with movable or even removable storage media.

In an embodiment, the bit rate of the OTUCn(L) is determined by the transport application and so by the network operator. This could be a static parameter provisioned when a link is initialized, and could directly or indirectly provision the framer 902, a Digital Signal Processor (DSP), and the optics (in interface 906) in communication equipment. Other parameters related to that transport bit rate will also provision the DSP and the optics (such as the modulation format, the number of sub-carriers and their location on the optical grid, etc.). As for the frame itself, the bit rate will determine the OTUCn(L) frame structure in a unique way as X=n×10+q; this means that the bit rate is X×10G Class (in the range of roughly X×10.7G-11.4G bit rate) and that the frame is structured with n concatenated 100G-class OTUC, plus one [q×10G]-class OTUL. For example, if X=53 and (n,q)=(5,3), then this would be a 530G-class OTUC5L frame (up to roughly 598 Gbps) built with 6 concatenated OTUk structures=5×100G-class OTUC (n=5) plus one 30G-class OTUL (q=3).

In some embodiments, there could be multiple types of OTUL frames, such as 10G frames and 50G frames. The framer 904 could then determine the set from among not only the first frames and the second frames, but from third frames as well. The third frames have the same common frame structure as the first frames and the second frames, but a third associated rate different from the associated rates of the first frames and the second frames. The set of frames determined by the framer 904 to provide the desired communication rate could include one or more of the first frames, the second frames, and the third frames.

Figure 11:
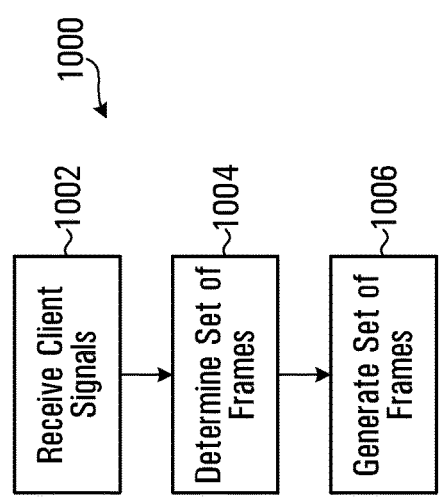
FIG. 11 is a flow chart illustrating an example method.

FIG. 11 is a flow chart illustrating an example method. The example method 1000 includes receiving client signals at 1002 for communication in an optical network. At 1004, a set of one or more of first frames and second frames that have a common frame structure but different associated rates, which provides a desired communication rate, is determined. The determined set of one or more of the first frames and the second frames including the received client signals is generated at 1006. Although not specifically shown in FIG. 10, the operations at 1002, 1004, 1006 could repeat as long as client signals are being received.

The example method 1000 represents one embodiment of the present disclosure. Other embodiments may involve fewer, further, or different operations performed in a similar or different order than shown. Options for performing the operations shown in FIG. 10, and/or other variations in the example method 1000, may be or become apparent, from the disclosure of apparatus embodiments for instance.

What has been described is merely illustrative of embodiments. Other arrangements and methods can be implemented by those skilled in the art.

For example, the foregoing description and the contents of the drawings are intended solely for illustrative purposes. Actual implementations may include further, fewer, or different elements interconnected in a similar or different manner than shown and/or described.

The example rates disclosed herein are also illustrative. Minimum bandwidth granularity could be finer than 10G, such as 5G, or coarser than 10G, such as 25G.

Bandwidth granularity selection could involve trading off other features or characteristics. For instance, with 25G bandwidth granularity and 10G Tributary Slot granularity, there would be 5G of extra dummy bandwidth per OTUk, which could be a concern in some implementations. With 10G bandwidth granularity, 10G Tributary Slots could be sufficient.

Fragmentation preference could also affect bandwidth granularity selection. Coarser granularity might be preferred where B100G OPUk payload should not be fragmented, whereas finer granularity could be feasible for implementations in which the B100G payload can be fragmented as n×100G non-fragmented payload+Z Gbps (Z=0, 10G, 20G, . . . 90G) extra traffic.

Any of various Electrical Lane (EL) bit rates could also or instead be used. OTLk.m Electrical Lanes between a B100G framer and a DSP, for example, could include 11.2G ELs, 28G ELs, and/or others.

The number of Logical Lanes per OTLk.m Electrical Lane, and/or LL bit rate could also or instead vary. Example bit rates are 5.6G LL and 28G LL.

A DSP device or other component could terminate the OTLk interface and reassemble the OTUk/ODUk format to remove/replace FEC columns, or instead limit the OTN processing at the 5G LL level (or 28G LL/EL) and just bit deinterleave/reinterleave 5G LLs or 28G LL/EL, and potentially align and overwrite some OH fields within each LL or group of LLs. If the latter case of limiting the processing, and with OTUCn(L) specs with 10G granularity as disclosed herein, an optical interface or other optics components could drop (to Line) and generate (to framer) 5G dummy LL(s).

In transporting an OTUk-240 signal, for example, there would be 0.4% extra padding/bandwidth if not terminating the OTLk. See FIG. 3, for example. The 16 extra FS columns shown as "FS (pad)" in FIG. 3 could potentially be used to carry extra OH traffic and/or other information. This extra traffic would not exist in case the OTUk-239 (ODUk) would be inversely multiplexed and carried instead.

FEC could be handled by a framer, or externally by a DSP or other equipment component.

FIGS. 2 to 4 and 6 to 8 show 10G Tributary Slots (TSs) as an example. Other embodiments could use different sizes of TSs, such as 5G or 25G TS rate/granularity. For 5G TSs, for example, there are twice the number of TSs per frame compared to 10G TSs. Using 5G TSs, 5G or 25G bandwidth granularity can be supported without any waste. In this case X is a multiple of 5 and the bit rate will determine the OTUCn(L) frame structure as X=n×20+q since there are 20 TSs per OTUC frame. This means that the bit rate is X×5G-Class (in the range of roughly X×5.35G-5.7G bit rate), and that the frame is structured with n concatenated 100G-class OTUC frames plus one [q×5G]-class OTUL frame. For example, if X=55 and (n,q)=(2,15), then this would be a 275G-class OTUC2L frame built with 3 concatenated OTUk structures including 2×100G-class OTUC (n=2) plus a 15×5G-class OTUL (q=15).

Figure 12:
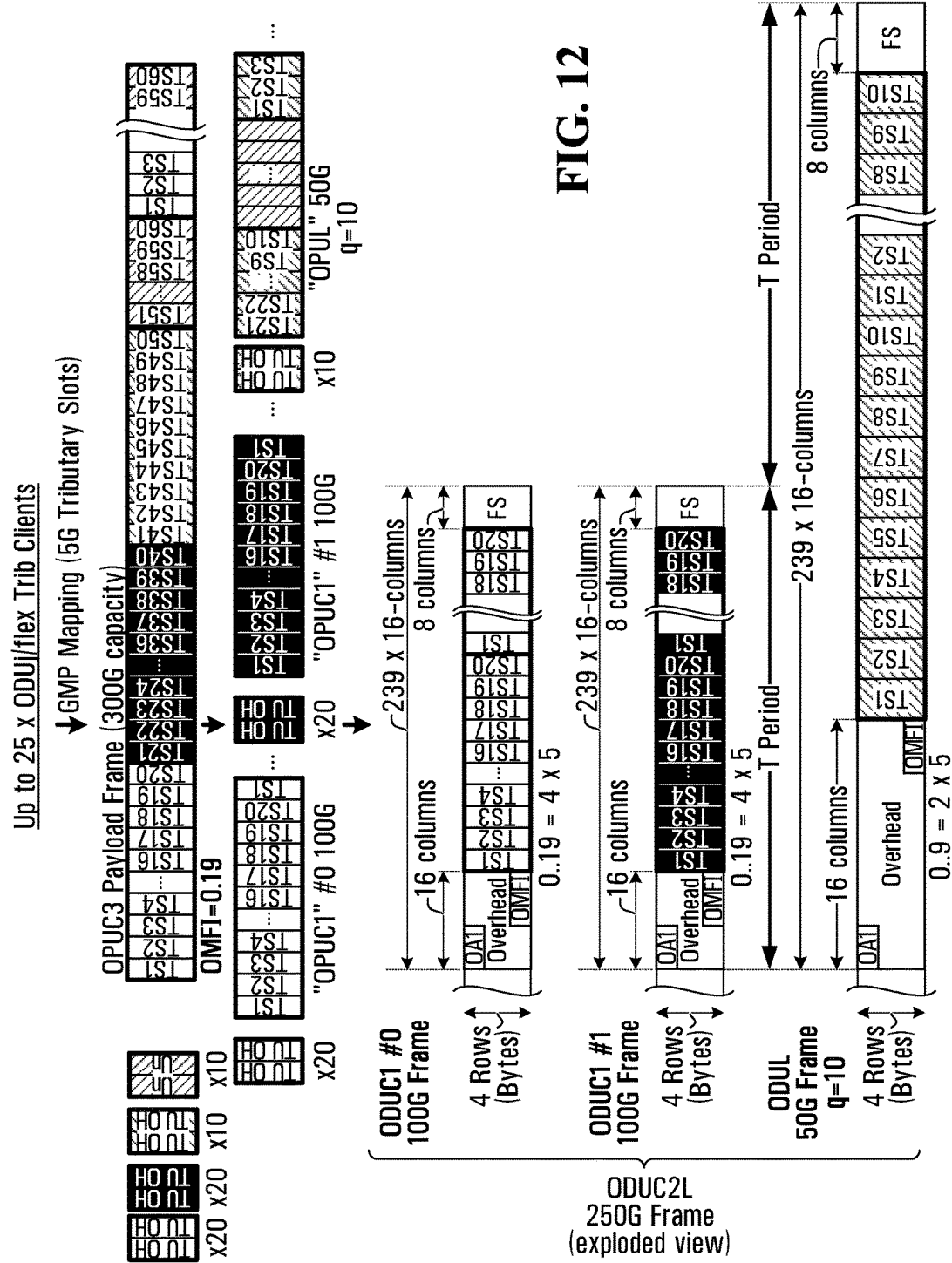
FIG. 12 illustrates an example of ODUC2L multiplexing to provide 250G payload capacity with 5G Tributary Slots.

FIG. 12 illustrates an example of ODUC2L multiplexing to provide 250G payload capacity with 5G TSs. For this rate and in the example shown, there could be up to 25 ODUj/flex tributary clients each using a minimum of 2×5G tributary slots, and the 250G desired or target rate could be provided in one embodiment as shown, using n=2×ODUC frames plus p=1×50G ODUL frame.

The two 100G ODUC frames ODUC1 #0 and ODUC1 #1 in FIG. 12 would be concatenated with the 50G ODUL frame. In this example, the rate is 250G=X×5G, so X=50 and (n, q)=(2, 10). It should be noted that this example of each tributary client using a minimum of 2 TSs is solely for illustrative purposes, and might be useful where it is desired to limit the number of client ports. However, in other embodiments, tributary clients could use one or more TSs, and/or different clients could use different numbers of TSs.

Figure 13:
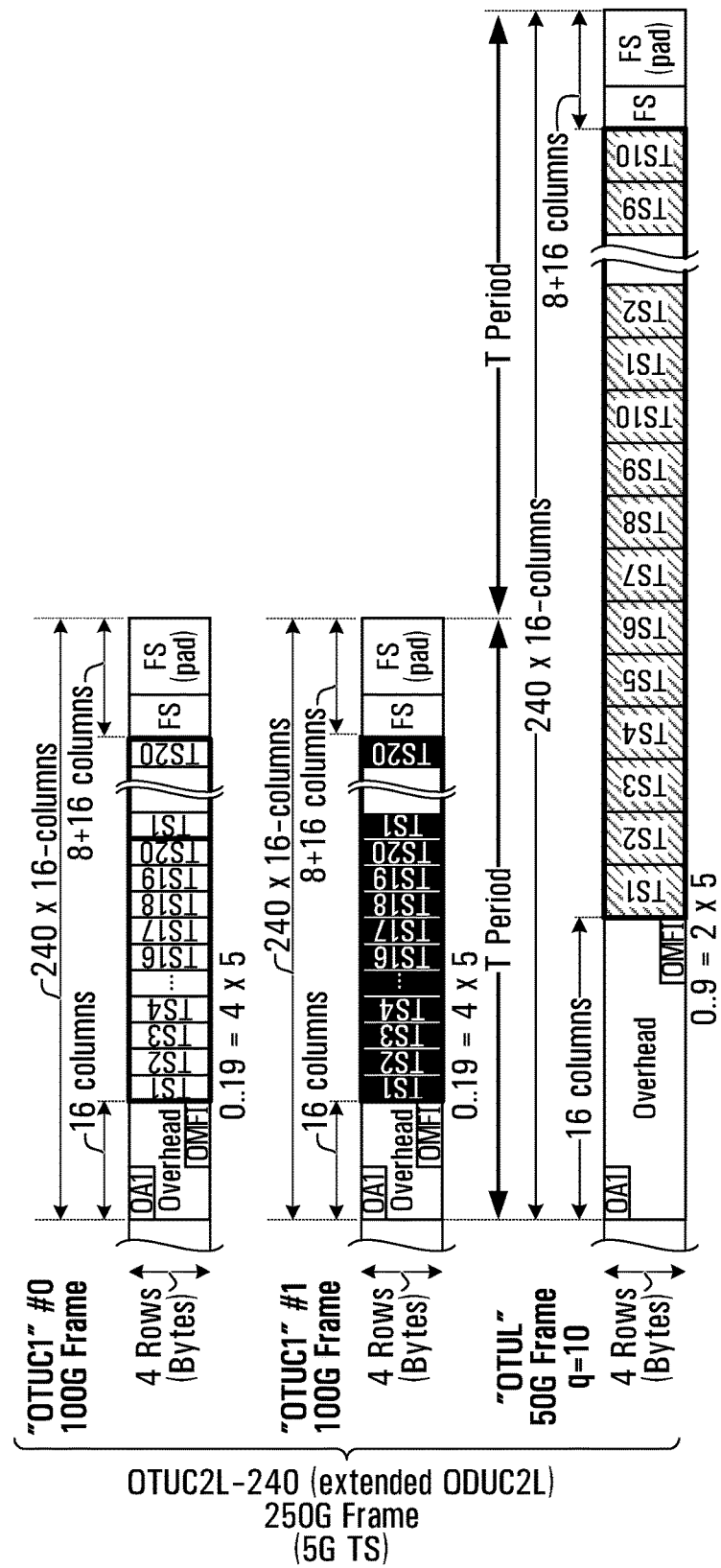
FIG. 13 shows a related example OTUC2L-240 structure (extended ODUC2L) to provide 250G payload capacity with 5G Tributary Slots.
Figure 14:
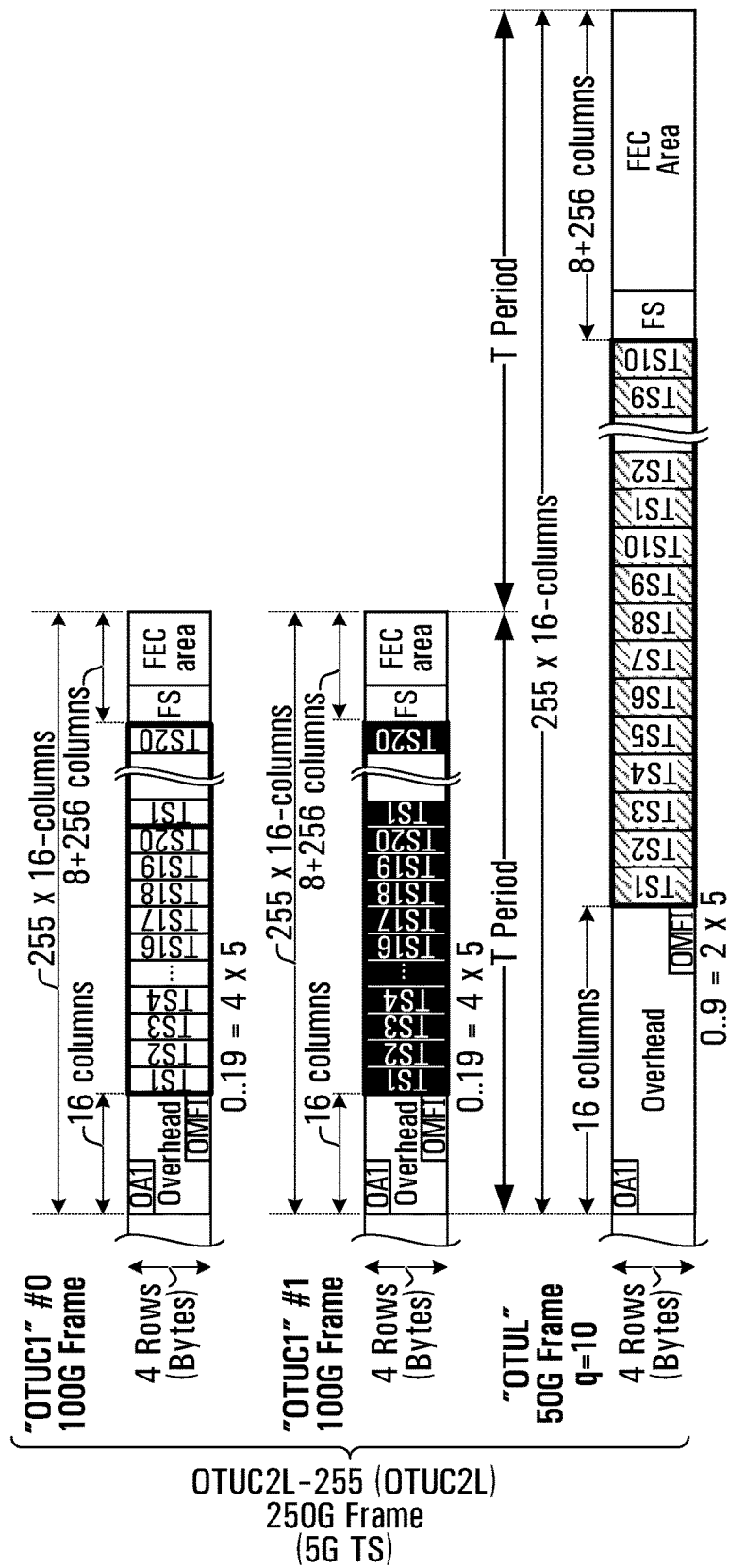
FIG. 14 shows a related example OTUC2L-255 structure to provide 250G payload capacity with 5G Tributary Slots.

FIG. 13 shows a related example OTUC2L-240 structure (extended ODUC2L) to provide 250G payload capacity with 5G Tributary Slots and FIG. 14 shows a related example OTUC2L-255 structure to provide 250G payload capacity with 5G Tributary Slots, with FS padding in FIG. 13 and FEC areas in FIG. 14.

Figure 15A:
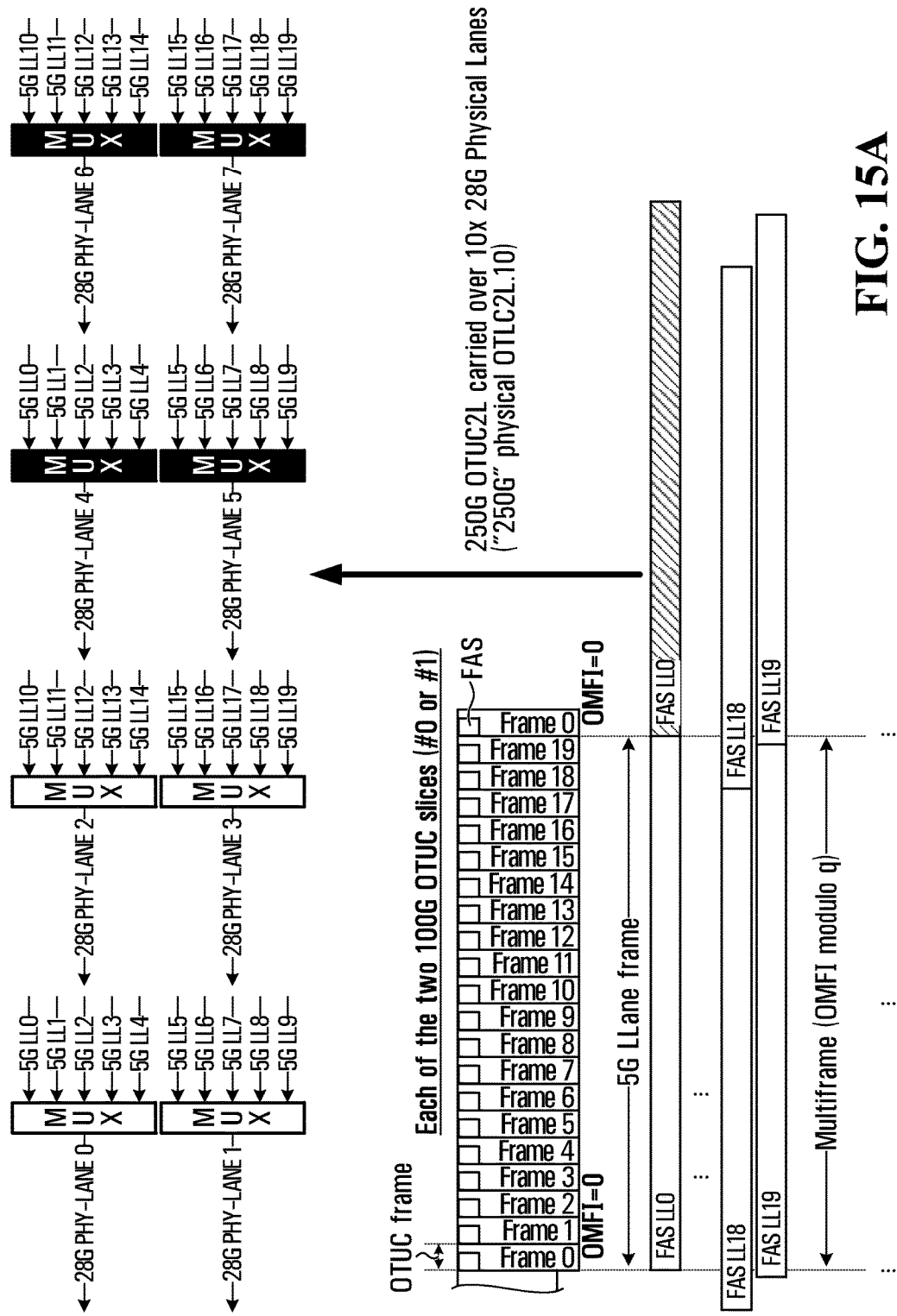
FIGS. 15A and 15B show an example OTLC2L.10 interface with 10×28G Physical Lanes, for an example of 5G Tributary Slots.
Figure 15B:
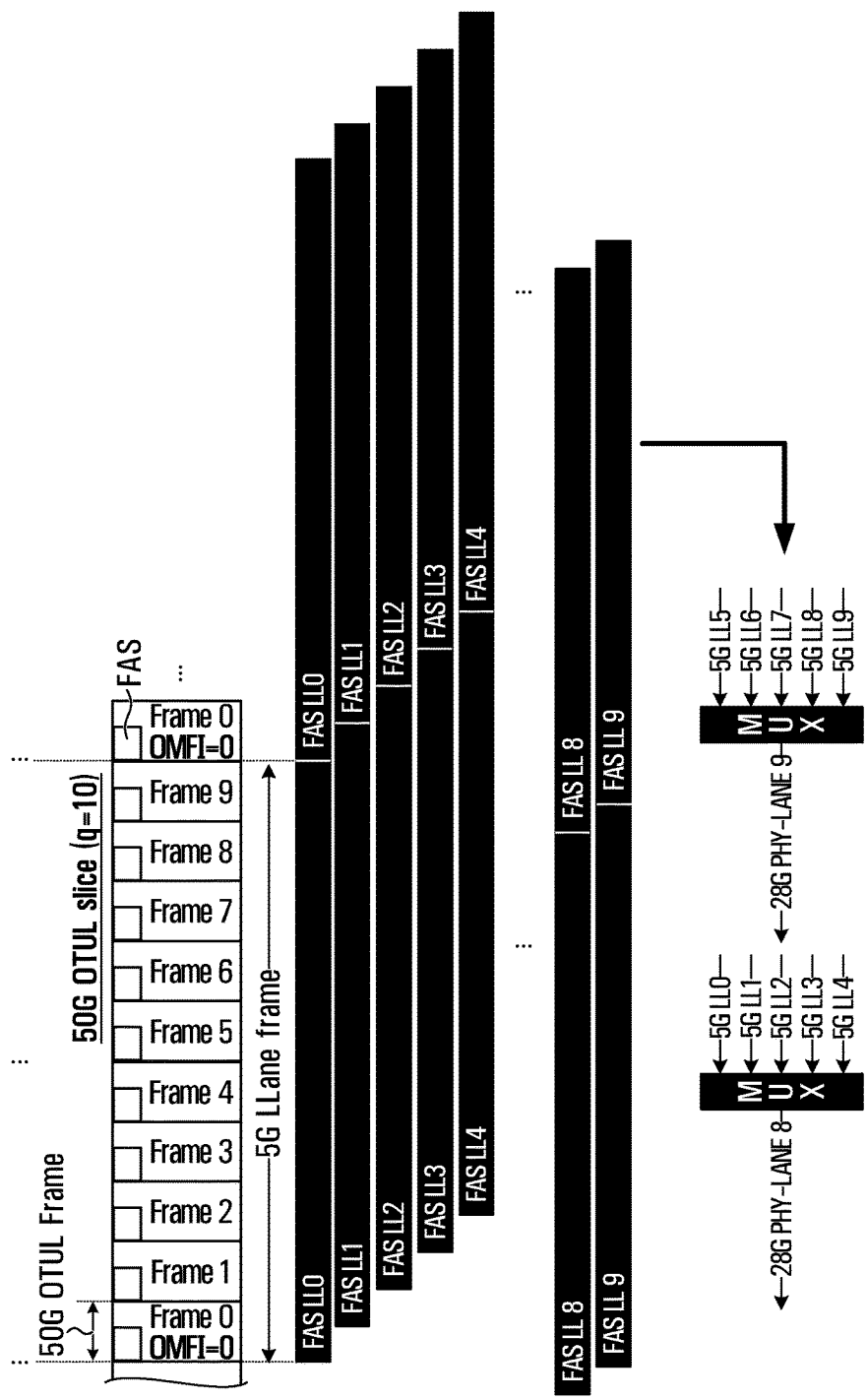

FIGS. 15A and 15B show an example OTLC2L.10 interface with 10×28G Physical Lanes for an example of 5G Tributary Slots and (n,q)=(2,10), with 10×28G (25G-class) Physical Lanes, each labelled in the drawing as a PHY-LANE. OTUC and OTUL slices and logical lane frames are also shown. The OTUC and OTUL slices have different numbers of frames per multiframe and thus different frame rates, but the frame formats and the multiframe rates are the same.

FIGS. 12 to 15B relate to an example of OTUC2L-250G (q=10). This is the same bit rate as the example in FIGS. 2 to 5B with 10G TSs. FIGS. 12 to 15B are similar to FIGS. 2 to 5B, but differ in the number of TSs and TS granularity (5G vs. 10G). Also, for 5G TSs, X=(n×20)+q=50, with an approximate bit rate of X×5G.

Figure 16:
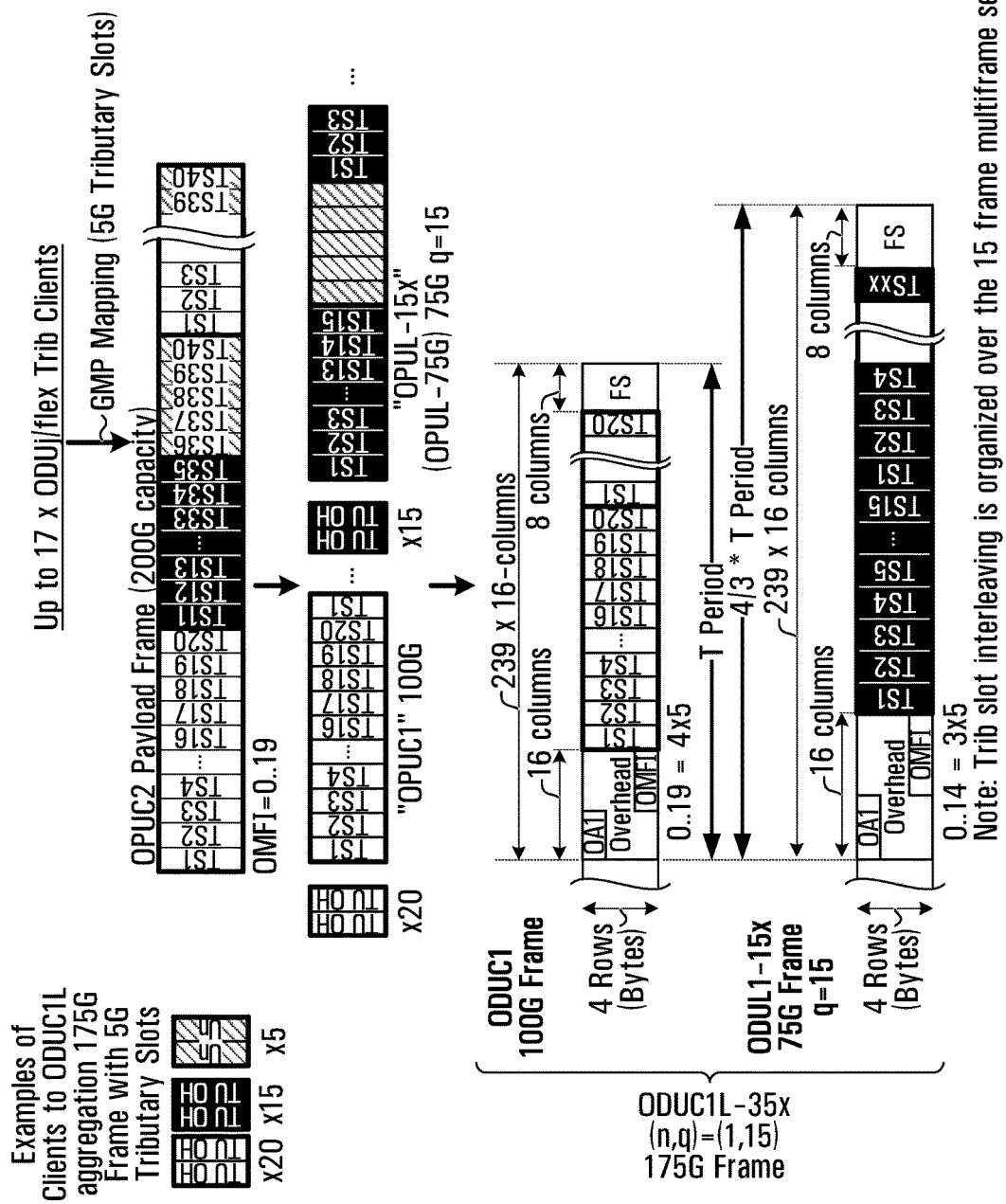
FIG. 16 illustrates an example of ODUC1 L (ODUC1 L-35x) multiplexing to provide 175G payload capacity with 5G Tributary Slots.

FIG. 16 illustrates an example of ODUC1L (ODUC1L-35x) multiplexing to provide 175G payload capacity with 5G TSs and (n,q)=(1,15). For this rate and in the example shown, there could be up to 35 ODUj/flex tributary clients using 5G tributary slots, and the 175G desired or target rate could be provided using any of various combinations of 100G, 50G, 10G, and 5G frames. In the example shown, there is 1 ODUC frame plus 1×75G ODUL frame. At the OPU level in FIG. 16, this is shown as 15×5G frames. In this example, the rate is 175G=X×5G, so X=35 and (n, q)=(1, 15).

Figure 17:
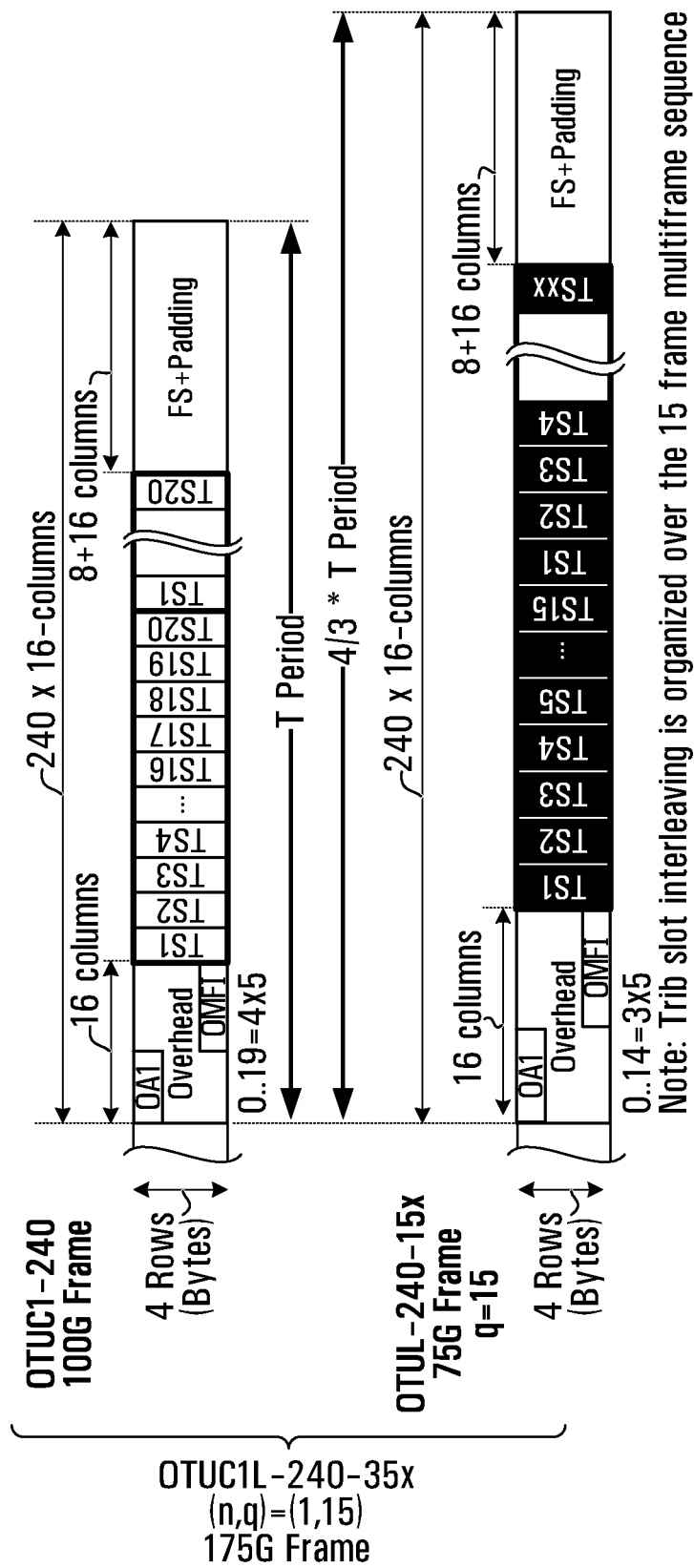
FIG. 17 shows a related example OTUC1 L-240-35x structure (extended OTUC1 L) to provide 175G payload capacity with 5G Tributary Slots.
Figure 18:
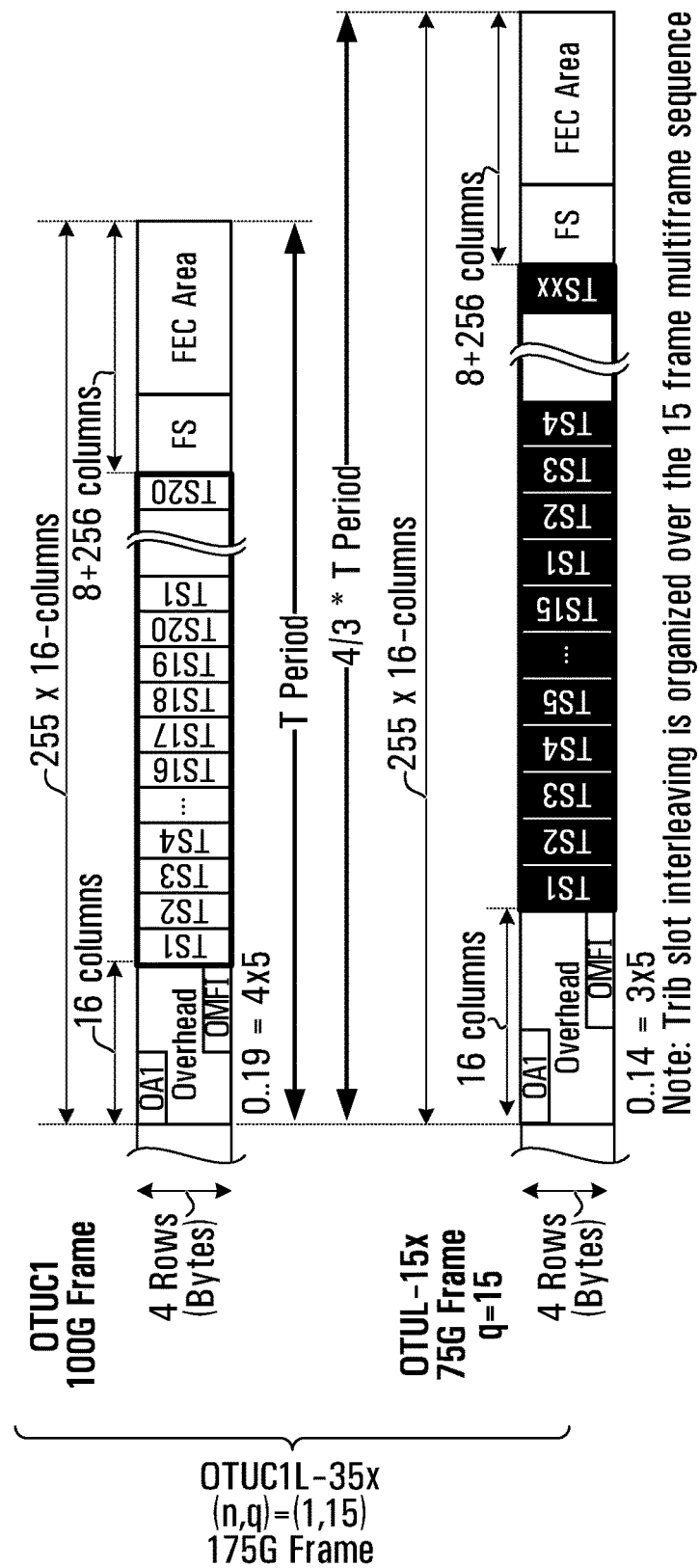
FIG. 18 shows a related example OTUC1 L-35x structure to provide 175G payload capacity with 5G Tributary Slots.

FIG. 17 shows a related example OTUC1 L-240-35x structure (extended OTUC1L) to provide 175G payload capacity with 5G Tributary Slots and FIG. 18 shows a related example OTUC1 L-175G structure to provide 175G payload capacity with 5G Tributary Slots, with FS padding in FIG. 17 and FEC areas in FIG. 18. As noted in FIGS. 17 and 18, TS interleaving is organized over a multiframe sequence in these examples. In the case of some odd numbers of TSs, the TS interleaving might not align to the frame, but still align to the q-frame multiframe instead. This is also applicable to the 170G examples in FIGS. 6 to 8 as well. In the case of the 70G OTUL frames in FIGS. 7 and 8, the last TS of a frame might not always be TS7; it could be dependent on the frame number.

Figure 19A:
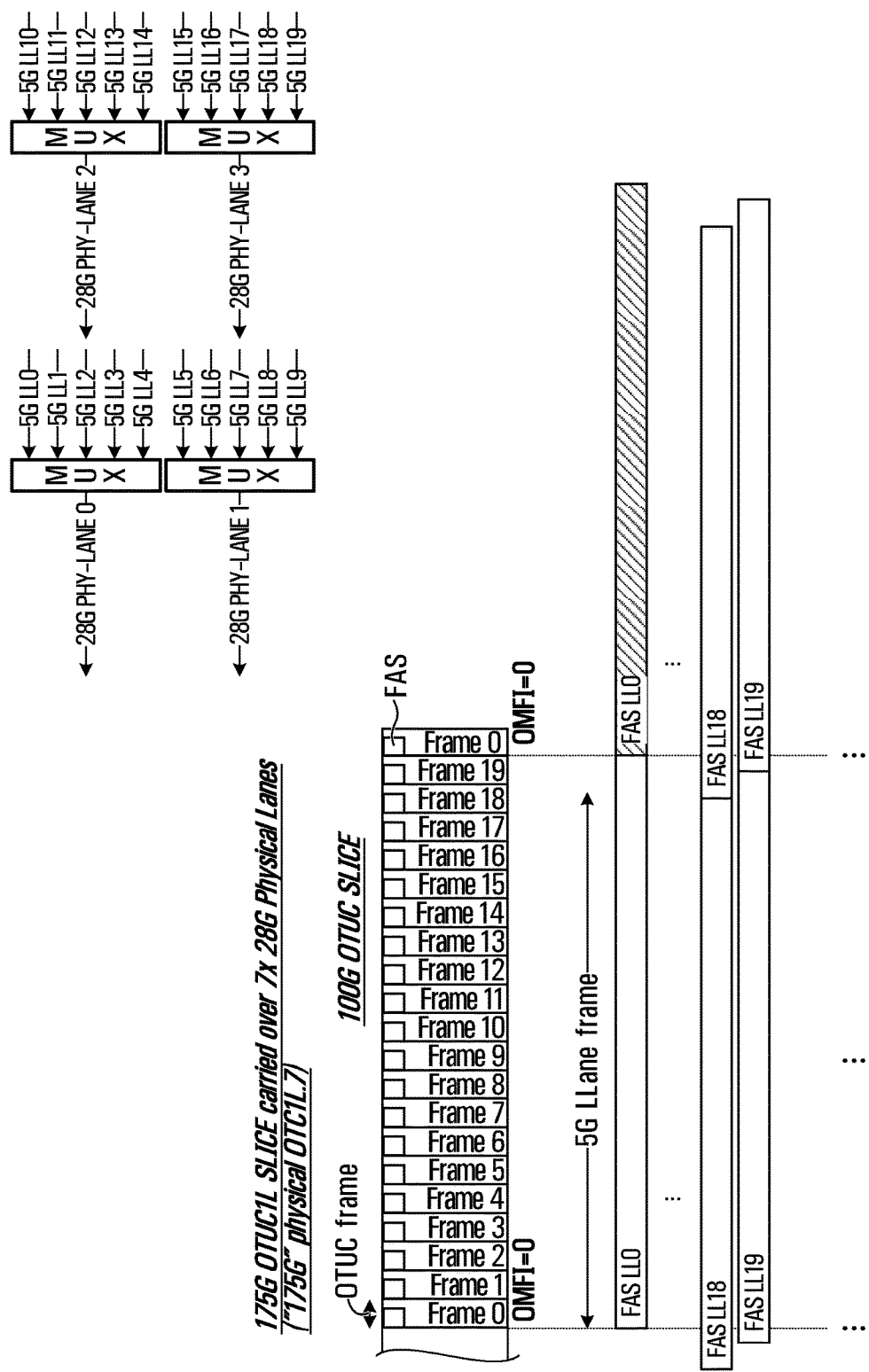
FIGS. 19A and 19B show an example OTLC1L.7 interface with 7×28G Physical Lanes, for an example of 5G Tributary Slots.
Figure 19B:
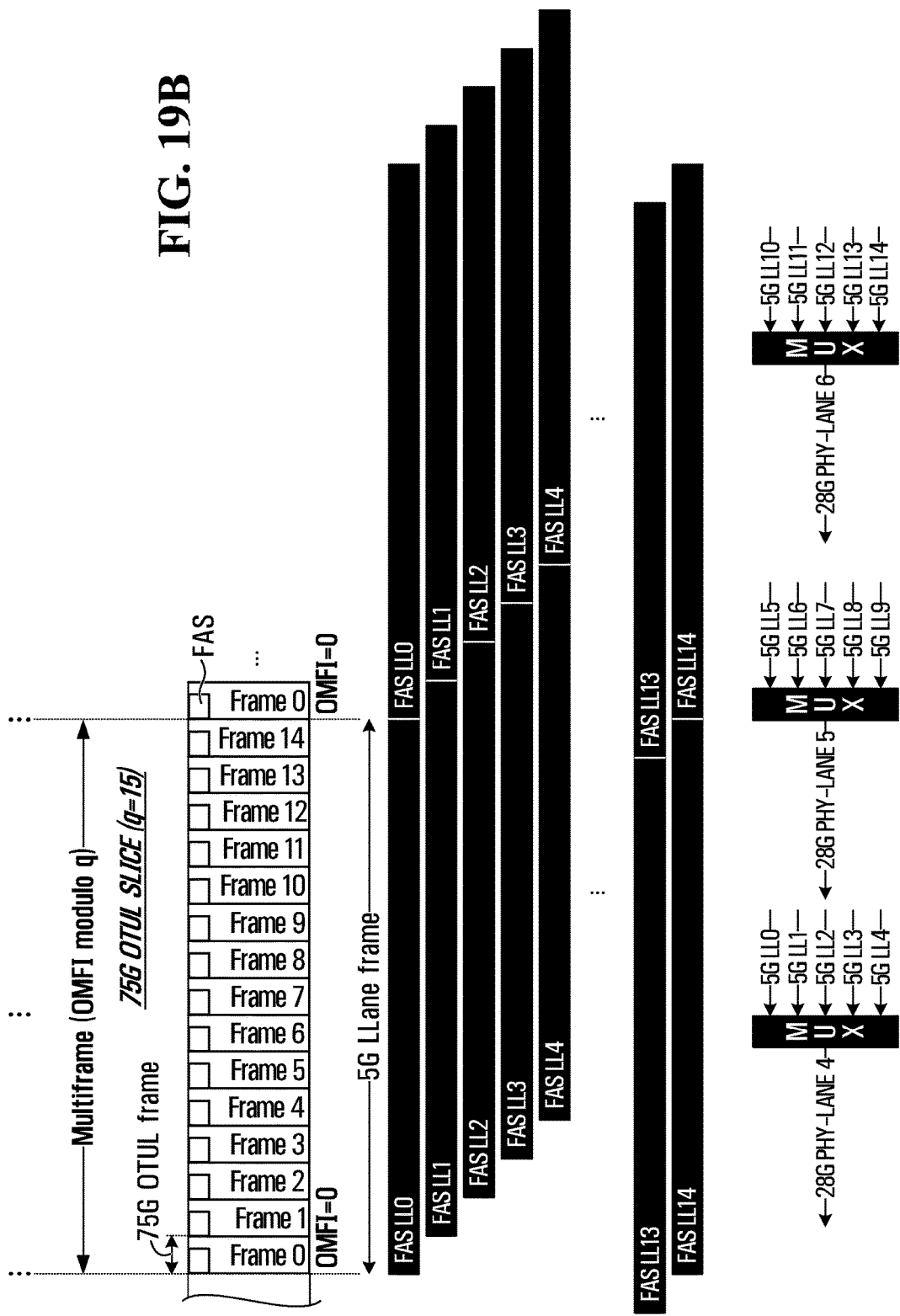

FIGS. 19A and 19B shows an example OTLC1 L.7 interface with 7×28G Physical Lanes, for an example of 5G Tributary Slots and (n,q)=(1,15). As in FIGS. 15A and 15B, OTUC and OTUL slices and logical lane frames are also shown and the OTUC and OTUL slices have different numbers of frames per multiframe and thus different frame rates. However, the frame formats are the same and slices/frames can be handled and inversely multiplexed in a similar manner into Logical Lanes of same formats and same bit rates (for example 5.6 Gbps) regardless of whether the slice/frame is an OTUC slice/frame or an OTUL slice/frame. Unlike in FIG. 9B, there is no dummy LL (Logical Lane) in FIG. 19B since all 15 available LLs are used on the 28G PHY lanes 4 to 6.

OTUC1L-175G (q=15) is an example of a bit rate that takes advantage of the 5G TS granularity. It is similar to the 170G example in FIGS. 6 to 9B, but in FIGS. 16 to 19B we have the case of 5G TSs, with X=(n×20)+q=35, with an approximate bit rate of X×5G.

The present disclosure could also or instead be extended to other sizes of TSs. For 25G TSs, X=n×4+q, X is a multiple of 25, and there are 4 TSs per 100G OTUC frame.

Other variations could be or become apparent based on the present disclosure.

We claim:

1. An apparatus comprising:
an interface to receive mapped client signals in higher order OPU frames;
a framer coupled to the interface to frame the mapped client signals in each of the OPU frames into ODU frames and to frame the ODU frames into OTU frames, wherein the ODU frames and the OTU frames respectively comprise heterogeneous concatenations of multiple ODU frames and multiple OTU frames that are selected by the framer based on a target communication rate lower than a rate associated with the received OPU frames, and have a common frame structure with the received OPU frames and different rates,
wherein the client signals are mapped to Tributary Slots in a payload of the OPU frames,
wherein the framer is configured to fragment the payload of each of the OPU frames between Tributary Slots in a payload of the ODU frames,
wherein the Tributary Slots in the payload of the OPU frames and the Tributary Slots in the payload of the ODU frames have the same associated rate, and
wherein the payload of each of the ODU frames has a different number of Tributary Slots than the payload of the OPU frames.

2. The apparatus of claim 1, the multiple ODU frames and the multiple OTU frames comprising first ODU frames and first OTU frames having an associated first rate, and second ODU frames and second OTU frames having an associated second rate, wherein the first rate is a multiple of the second rate.

3. The apparatus of claim 1, the multiple ODU frames and the multiple OTU frames comprising first ODU frames and first OTU frames having an associated first rate, and second ODU frames and second OTU frames having an associated second rate, wherein the first rate is 100G and the second rate is 50G.

4. The apparatus of claim 1, the multiple ODU frames and the multiple OTU frames comprising first ODU frames and first OTU frames having an associated first rate, and second ODU frames and second OTU frames having an associated second rate wherein the first rate is a fractional multiple of the second rate.

5. The apparatus of claim 1, the multiple ODU frames and the multiple OTU frames comprising first ODU frames and first OTU frames having an associated first rate, and second ODU frames and second OTU frames having an associated second rate, wherein the first rate is 100G and the second rate is either any multiple of 10G up to 90G or any multiple of 5G up to 95G.

6. The apparatus of claim 1, the multiple ODU frames and the multiple OTU frames comprising first ODU frames and first OTU frames having an associated first rate, and second ODU frames and second OTU frames having an associated second rate, wherein the first rate is 100G and the second rate is any multiple of 25G up to 75G.

7. The apparatus of claim 1, further comprising:
a mapper, coupled to the interface, to provide the mapped client signals to the framer.

8. Optical communication equipment comprising:
the apparatus of claim 1.

9. The apparatus of claim 1, wherein the framer is configured to fragment the payload of each of the OPU frames by removing unused Tributary Slots and redistributing Tributary Slots that carry client signals into the payloads of the ODU frames.

10. The apparatus of claim 1, further comprising:
an optical interface, coupled to the framer, to distribute and inversely multiplex the multiple OTU frames of different rates comprising the heterogeneous concatenations to different numbers of physical and Logical Lanes.

11. The apparatus of claim 10, wherein the Logical Lanes have a 5G rate.

12. A method comprising:
receiving mapped client signals in higher order OPU frames;
framing the mapped client signals in each of the OPU frames into ODU frames; and
framing the ODU frames into OTU frames,
wherein the ODU frames and the OTU frames respectively comprise heterogeneous concatenations of multiple ODU frames and multiple OTU frames that are selected based on a target communication rate lower than a rate associated with the received OPU frames, and have a common frame structure with the received OPU frames and different rates,
wherein the client signals are mapped to Tributary Slots in a payload of the OPU frames,
wherein the framer is configured to fragment the payload of each of the OPU frames between Tributary Slots in a payload of the ODU frames,
wherein the Tributary Slots in the payload of the OPU frames and the Tributary Slots in the payload of the ODU frames have the same associated rate, and
wherein the payload of each of the ODU frames has a different number of Tributary Slots than the payload of the OPU frames.

13. The method of claim 12, the multiple ODU frames and the multiple OTU frames comprising first ODU frames and first OTU frames having an associated first rate, and second ODU frames and second OTU frames having an associated second rate, wherein the first rate is a multiple of the second rate.

14. The method of claim 12, the multiple ODU frames and the multiple OTU frames comprising first ODU frames and first OTU frames having an associated first rate, and second ODU frames and second OTU frames having an associated second rate, wherein the first rate is 100G and the second rate is 50G.

15. The method of claim 12, the multiple ODU frames and the multiple OTU frames comprising first ODU frames and first OTU frames having an associated first rate, and second ODU frames and second OTU frames having an associated second rate wherein the first rate is a fractional multiple of the second rate.

16. The method of claim 12, the multiple ODU frames and the multiple OTU frames comprising first ODU frames and first OTU frames having an associated first rate, and second ODU frames and second OTU frames having an associated second rate, wherein the first rate is 100G and the second rate is either any multiple of 10G up to 90G or any multiple of 5G up to 95G.

17. The method of claim 12, the multiple ODU frames and the multiple OTU frames comprising first ODU frames and first OTU frames having an associated first rate, and second ODU frames and second OTU frames having an associated second rate, wherein the first rate is 100G and the second rate is any multiple of 25G up to 75G.

18. The method of claim 12, further comprising:
fragmenting the payload of each of the OPU frames by removing unused Tributary Slots and redistributing Tributary Slots that carry client signals into the payloads of the ODU frames.

19. The method of claim 12, further comprising:
distributing and inversely multiplexing the multiple OTU frames of different rates comprising the heterogeneous concatenations to different numbers of physical and Logical Lanes.

20. The method of claim 19, wherein the Logical Lanes have a 5G rate.

21. An apparatus comprising:
an interface to receive mapped client signals in higher order OPU frames;
a framer coupled to the interface to frame the mapped client signals in each of the OPU frames into ODU frames and to frame the ODU frames into OTU frames,
wherein the ODU frames and the OTU frames respectively comprise heterogeneous concatenations of multiple ODU frames and multiple OTU frames that are selected by the framer based on a target communication rate lower than a rate associated with the received OPU frames, and have a common frame structure with the received OPU frames and different rates,
wherein the OPU frames comprise a concatenated structure of identical slices or frames having payloads with the same number of Tributary Slots of the same bit rate, and wherein the multiple ODU frames comprise a concatenated structure of multiple heterogeneous ODU slices or frames having payloads with the same Tributary Slots bit rate as the OPU frames but a different number of Tributary Slots.

22. The apparatus of claim 21, wherein the number of concatenated slices or frames in the ODU frames is equal to the number of concatenated slices or frames in the OPU frames.

23. The apparatus of claim 21, the multiple ODU frames and the multiple OTU frames comprising first ODU frames and first OTU frames having an associated first rate, and second ODU frames and second OTU frames having an associated second rate, wherein the first rate is a multiple or a fractional multiple of the second rate.

24. Optical communication equipment comprising:
the apparatus of claim 21.

25. A method comprising:
receiving mapped client signals in higher order OPU frames;
framing the mapped client signals in each of the OPU frames into ODU frames; and
framing the ODU frames into OTU frames,
wherein the ODU frames and the OTU frames respectively comprise heterogeneous concatenations of multiple ODU frames and multiple OTU frames that are selected based on a target communication rate lower than a rate associated with the received OPU frames, and have a common frame structure with the received OPU frames and different rates,
wherein the OPU frames comprise a concatenated structure of identical slices or frames having payloads with the same number of Tributary Slots of the same bit rate, and wherein the multiple ODU frames comprise a concatenated structure of multiple heterogeneous ODU slices or frames having payloads with the same Tributary Slots bit rate as the OPU frames but a different number of Tributary Slots.

26. The method of claim 25, wherein the number of concatenated slices or frames in the ODU frames is equal to the number of concatenated slices or frames in the OPU frames.

27. The method of claim 25, the multiple ODU frames and the multiple OTU frames comprising first ODU frames and first OTU frames having an associated first rate, and second ODU frames and second OTU frames having an associated second rate, wherein the first rate is a multiple or a fractional multiple of the second rate.

28. An apparatus comprising:
means for receiving mapped client signals in higher order OPU frames;

means for framing the mapped client signals in each of the OPU frames into ODU frames; and means for framing the ODU frames into OTU frames, wherein the ODU frames and the OTU frames respectively comprise heterogeneous concatenations of multiple ODU frames and multiple OTU frames that are selected based on a target communication rate lower than a rate associated with the received OPU frames, and have a common frame structure with the received OPU frames and different rates, wherein the OPU frames comprise a concatenated structure of identical slices or frames having payloads with the same number of Tributary Slots of the same bit rate, and wherein the multiple ODU frames comprise a concatenated structure of multiple heterogeneous ODU slices or frames having payloads with the same Tributary Slots bit rate as the OPU frames but a different number of Tributary Slots.

29. An apparatus comprising:

means for receiving mapped client signals in higher order OPU frames;

means for framing the mapped client signals in each of the OPU frames into ODU frames; and means for framing the ODU frames into OTU frames, wherein the ODU frames and the OTU frames respectively comprise heterogeneous concatenations of multiple ODU frames and multiple OTU frames that are selected based on a target communication rate lower than a rate associated with the received OPU frames, and have a common frame structure with the received OPU frames and different rates, wherein the client signals are mapped to Tributary Slots in a payload of the OPU frames, wherein the framer is configured to fragment the payload of each of the OPU frames between Tributary Slots in a payload of the ODU frames, wherein the Tributary Slots in the payload of the OPU frames and the Tributary Slots in the payload of the ODU frames have the same associated rate, and wherein the payload of each of the ODU frames has a different number of Tributary Slots than the payload of the OPU frames.

* * * * *